US010568191B2

(12) United States Patent
Vendetti et al.

(10) Patent No.: US 10,568,191 B2
(45) Date of Patent: Feb. 18, 2020

(54) SYSTEMS AND METHODS FOR OUTDOOR LUMINAIRE WIRELESS CONTROL

(71) Applicant: Express Imaging Systems, LLC, Renton, WA (US)

(72) Inventors: Donald Arthur Vendetti, Seattle, WA (US); Richard Dolf, Seattle, WA (US); William G. Reed, Seattle, WA (US)

(73) Assignee: EXPRESS IMAGING SYSTEMS, LLC, Renton, WA (US)

( * ) Notice: Subject to any disclaimer, the term of this patent is extended or adjusted under 35 U.S.C. 154(b) by 0 days.

(21) Appl. No.: 16/440,612

(22) Filed: Jun. 13, 2019

(65) Prior Publication Data
US 2019/0394862 A1 Dec. 26, 2019

Related U.S. Application Data

(63) Continuation-in-part of application No. 16/284,869, filed on Feb. 25, 2019, now Pat. No. 10,390,414, (Continued)

(51) Int. Cl.
H05B 37/02 (2006.01)
F21V 23/06 (2006.01)
(Continued)

(52) U.S. Cl.
CPC ....... H05B 37/0272 (2013.01); F21V 23/045 (2013.01); F21V 23/06 (2013.01); *F21V 15/01* (2013.01); *F21W 2131/103* (2013.01)

(58) Field of Classification Search
CPC .............. H05B 37/02; H05B 37/0227; H05B 37/0272; F21V 23/06; F21V 15/01; F21V 23/045; F21W 2131/103
See application file for complete search history.

(56) References Cited

U.S. PATENT DOCUMENTS 2,745,055 A    5/1956   Woerdemann
4,153,927 A    5/1979   Owens
(Continued)

FOREIGN PATENT DOCUMENTS

CN    103162187 A   6/2013
DE    40 01 980 A1  8/1990
(Continued)

OTHER PUBLICATIONS

"Lcd Backlight I/O Ports and Power Protection Circuit Design," dated May 2, 2011, retrieved Jun. 10, 2011, from http://www.chipoy.info/gadgets/lcd-backlight-i-o-ports-and-power-pr . . . , 4 pages.
(Continued)

*Primary Examiner* — Jimmy T Vu
(74) *Attorney, Agent, or Firm* — Cozen O'Connor

(57) ABSTRACT

Systems and methods which leverage the wireless communication capability present in wireless-enabled luminaires where the lamps include a short-range wireless transceiver and can be controlled by a smart appliance. The wireless capability of a luminaire may be paired with a compatible wireless interface system (e.g., adapter system) that allows for control of the luminaire via plug-in or hard-wired photocontrols and wireless network lamp control nodes. An adapter system may be provided that replaces a standard wired receptacle of a luminaire. The adapter system may include a wired interface to the luminaire which provides power to the wireless adapter system. The wireless adapter system may include a receptacle interface that receives a plug of a control node, such as photocontrol or a networked control node. The wireless adapter system may also include a wireless interface circuit that communicates control, status or other data between the connected control device and the luminaire.

24 Claims, 17 Drawing Sheets

Related U.S. Application Data which is a continuation of application No. 15/943,183, filed on Apr. 2, 2018, now Pat. No. 10,219,360.

(60) Provisional application No. 62/480,833, filed on Apr. 3, 2017.

(51) Int. Cl.
*F21V 23/04* (2006.01)
*F21W 131/103* (2006.01)
*F21V 15/01* (2006.01)

(56) References Cited

U.S. PATENT DOCUMENTS

| | | |
|---|---|---|
| 4,237,377 A | 12/1980 | Sansum |
| 4,663,521 A | 5/1987 | Maile |
| 5,086,379 A | 2/1992 | Denison et al. |
| 5,160,202 A | 11/1992 | Légaré |
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 5,838,226 A | 11/1998 | Houggy et al. |
| 5,936,362 A | 8/1999 | Alt et al. |
| 6,111,739 A | 8/2000 | Wu et al. |
| 6,160,353 A | 12/2000 | Mancuso |
| 6,377,191 B1 | 4/2002 | Takubo |
| 6,612,720 B1 | 9/2003 | Beadle |
| 6,674,060 B2 | 1/2004 | Antila |
| 6,753,842 B1 | 6/2004 | Williams et al. |
| 6,828,911 B2 | 12/2004 | Jones et al. |
| 6,841,947 B2 | 1/2005 | Berg-johansen |
| 6,880,956 B2 | 4/2005 | Zhang |
| 6,902,292 B2 | 6/2005 | Lai |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,196,477 B2 | 3/2007 | Richmond |
| 7,218,056 B1 | 5/2007 | Harwood |
| 7,239,087 B2 | 7/2007 | Ball |
| 7,252,385 B2 | 8/2007 | Engle et al. |
| 7,258,464 B2 | 8/2007 | Morris et al. |
| 7,281,820 B2 | 10/2007 | Bayat et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,564,198 B2 | 7/2009 | Yamamoto et al. |
| 7,569,802 B1 | 8/2009 | Mullins |
| 7,578,596 B2 | 8/2009 | Martin |
| 7,578,597 B2 | 8/2009 | Hoover et al. |
| 7,623,042 B2 | 11/2009 | Huizenga |
| 7,627,372 B2 | 12/2009 | Vaisnys et al. |
| 7,631,324 B2 | 12/2009 | Buonasera et al. |
| 7,633,463 B2 | 12/2009 | Negru |
| 7,665,862 B2 | 2/2010 | Villard |
| 7,677,753 B1 | 3/2010 | Wills |
| 7,688,002 B2 | 3/2010 | Ashdown et al. |
| 7,688,222 B2 | 3/2010 | Peddie et al. |
| 7,697,925 B1 | 4/2010 | Wilson et al. |
| 7,703,951 B2 | 4/2010 | Piepgras et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,174,212 B2 | 5/2012 | Tziony et al. |
| 8,183,797 B2 | 5/2012 | McKinney |
| 8,207,830 B2 | 6/2012 | Rutjes et al. |
| 8,260,575 B2 | 9/2012 | Walters et al. |
| 8,290,710 B2 | 10/2012 | Cleland et al. |
| 8,324,840 B2 | 12/2012 | Shteynberg et al. |
| 8,334,640 B2 | 12/2012 | Reed et al. |
| 8,378,563 B2 | 2/2013 | Reed et al. |
| 8,390,475 B2 | 3/2013 | Feroldi |
| 8,427,076 B2 | 4/2013 | Bourquin et al. |
| 8,436,556 B2 | 5/2013 | Eisele et al. |
| 8,450,670 B2 | 5/2013 | Verfuerth et al. |
| 8,457,793 B2 | 6/2013 | Golding et al. |
| 8,508,137 B2 | 8/2013 | Reed |
| 8,541,950 B2 | 9/2013 | Reed |
| 8,547,022 B2 | 10/2013 | Summerford et al. |
| 8,610,358 B2 | 12/2013 | Reed |
| 8,629,621 B2 | 1/2014 | Reed |
| 8,674,608 B2 | 3/2014 | Holland et al. |
| 8,749,403 B2 | 6/2014 | King et al. |
| 8,810,138 B2 | 8/2014 | Reed |
| 8,872,964 B2 | 10/2014 | Reed et al. |
| 8,878,440 B2 | 11/2014 | Reed |
| 8,896,215 B2 | 11/2014 | Reed et al. |
| 8,901,825 B2 | 12/2014 | Reed |
| 8,922,124 B2 | 12/2014 | Reed et al. |
| 8,926,138 B2 | 1/2015 | Reed et al. |
| 8,926,139 B2 | 1/2015 | Reed et al. |
| 8,975,827 B2 | 3/2015 | Chobot et al. |
| 8,987,992 B2 | 3/2015 | Reed |
| 8,988,005 B2 | 3/2015 | Jungwirth et al. |
| 9,002,522 B2 | 4/2015 | Mohan et al. |
| 9,024,545 B2 | 5/2015 | Bloch et al. |
| 9,107,026 B1 | 8/2015 | Viswanadham et al. |
| 9,119,270 B2 | 8/2015 | Chen et al. |
| 9,204,523 B2 | 12/2015 | Reed et al. |
| 9,210,751 B2 | 12/2015 | Reed |
| 9,210,759 B2 | 12/2015 | Reed |
| 9,288,873 B2 | 3/2016 | Reed |
| 9,312,451 B2 | 4/2016 | Reed et al. |
| 9,357,618 B2 | 5/2016 | Pandharipande et al. |
| 9,414,449 B2 | 8/2016 | Reed |
| 9,466,443 B2 | 10/2016 | Reed |
| 9,572,230 B2 | 2/2017 | Reed |
| 9,693,433 B2 | 6/2017 | Reed et al. |
| 9,713,228 B2 | 7/2017 | Reed |
| 9,801,248 B2 | 10/2017 | Reed et al. |
| 10,009,983 B2 | 6/2018 | Noesner |
| 10,068,468 B2 * | 9/2018 | John .................... G08G 1/005 |
| 2003/0016143 A1 | 1/2003 | Ghazarian |
| 2003/0184672 A1 | 10/2003 | Wu et al. |
| 2004/0192227 A1 | 9/2004 | Beach et al. |
| 2006/0014118 A1 | 1/2006 | Utama |
| 2006/0066264 A1 | 3/2006 | Ishigaki et al. |
| 2006/0146652 A1 | 7/2006 | Huizi et al. |
| 2007/0032990 A1 | 2/2007 | Williams et al. |
| 2007/0102033 A1 | 5/2007 | Petrocy |
| 2007/0225933 A1 | 9/2007 | Shimomura |
| 2008/0018261 A1 | 1/2008 | Kastner |
| 2008/0025020 A1 | 1/2008 | Kolb |
| 2008/0043106 A1 | 2/2008 | Hassapis et al. |
| 2008/0130304 A1 | 6/2008 | Rash et al. |
| 2008/0266839 A1 | 10/2008 | Claypool et al. |
| 2009/0046151 A1 | 2/2009 | Nagaoka et al. |
| 2009/0058320 A1 | 3/2009 | Chou et al. |
| 2009/0153062 A1 | 6/2009 | Guo et al. |

(56) References Cited

U.S. PATENT DOCUMENTS

| | | |
|---|---|---|
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195162 A1 | 8/2009 | Maurer et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0278479 A1 | 11/2009 | Planter et al. |
| 2010/0001652 A1 | 1/2010 | Damsleth |
| 2010/0052557 A1 | 3/2010 | Van Der Veen et al. |
| 2010/0123403 A1 | 5/2010 | Reed |
| 2010/0171442 A1 | 7/2010 | Draper et al. |
| 2010/0237711 A1 | 9/2010 | Parsons |
| 2010/0244708 A1 | 9/2010 | Cheung et al. |
| 2010/0246168 A1 | 9/2010 | Verfuerth et al. |
| 2010/0259193 A1 | 10/2010 | Umezawa et al. |
| 2010/0271802 A1 | 10/2010 | Recker et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0215724 A1 | 9/2011 | Chakravarty et al. |
| 2011/0221346 A1 | 9/2011 | Lee et al. |
| 2011/0251751 A1 | 10/2011 | Knight |
| 2011/0282468 A1 | 11/2011 | Ashdown |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0098439 A1 | 4/2012 | Recker et al. |
| 2012/0146518 A1 | 6/2012 | Setomoto et al. |
| 2012/0169053 A1 | 7/2012 | Tchoryk, Jr. et al. |
| 2012/0169239 A1 | 7/2012 | Chen et al. |
| 2012/0181935 A1 | 7/2012 | Velazquez |
| 2012/0194054 A1 | 8/2012 | Johnston et al. |
| 2012/0221154 A1 | 8/2012 | Runge |
| 2012/0242254 A1 | 9/2012 | Kim et al. |
| 2012/0286770 A1 | 11/2012 | Schröder et al. |
| 2013/0057158 A1 | 3/2013 | Josefowicz et al. |
| 2013/0126715 A1 | 5/2013 | Flaherty |
| 2013/0141000 A1 | 6/2013 | Wei et al. |
| 2013/0163243 A1 | 6/2013 | Reed |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0028200 A1 | 1/2014 | Van Wagoner et al. |
| 2014/0055990 A1 | 2/2014 | Reed |
| 2014/0159585 A1 | 6/2014 | Reed |
| 2014/0166447 A1 | 6/2014 | Thea et al. |
| 2014/0244044 A1 | 8/2014 | Davis et al. |
| 2014/0359078 A1 | 12/2014 | Liu |
| 2015/0015716 A1 | 1/2015 | Reed et al. |
| 2015/0069920 A1 | 3/2015 | Denteneer et al. |
| 2015/0123563 A1 | 5/2015 | Dahlen |
| 2016/0150622 A1 | 5/2016 | Flinsenberg et al. |
| 2016/0234899 A1 | 8/2016 | Reed et al. |
| 2018/0035518 A1 | 2/2018 | Cook |

FOREIGN PATENT DOCUMENTS

| | | |
|---|---|---|
| EP | 1 734 795 A1 | 12/2006 |
| EP | 2 320 713 A2 | 5/2011 |
| EP | 2 559 937 A1 | 2/2013 |
| EP | 2 629 491 A1 | 8/2013 |
| EP | 1 459 600 B1 | 2/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2006-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-535279 A | 8/2008 |
| JP | 2010-504628 A | 2/2010 |
| KR | 10-2005-0078403 A | 8/2005 |
| KR | 10-2006-0086254 A | 7/2006 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2010/086757 A1 | 8/2010 |
| WO | 2010/133719 A1 | 11/2010 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Corrected Notice of Allowance, dated Aug. 12, 2015, and Notice of Allowance, dated Jul. 31, 2015 for Reed et al., "Remotely Adjustable Solid-State Lamp," U.S. Appl. No. 13/875,130, 11 pages.
EE Herald, "Devices to protect High brightness LED from ESD," dated Mar. 16, 2009, retrieved Jun. 10, 2011, from http://www.eeherald.com/section/new-products/np100779.html, 1 page.
European Office Action, dated Aug. 11, 2017, for European Application No. 13 823 055.2-1802, 4 pages.
Extended European Search Report dated Aug. 25, 2016, for corresponding EP Application No. 14843796.5-1757, 6 pages.
Extended European Search Report dated Jan. 4, 2016, for corresponding EP Application No. 13823055.2-1802, 7 pages.
Extended European Search Report dated Oct. 21, 2015, for corresponding EP Application No. 13835001.2-1802, 7 pages.
Extended European Search Report, dated Aug. 13, 2014, for corresponding European Application No. 09826926.9, 8 pages.
Extended European Search Report, dated May 3, 2016, for corresponding European Application No. 12771286.7, 9 pages.
Extended European Search Report, dated Sep. 28, 2015, for corresponding European Application No. 12850159.0-1802, 6 pages.
Fairchild Semiconductor, "LED Application Design Guide Using Half-Bridge LLC Resonant Converter for 100W Street Lighting,"AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report and Written Opinion, dated Feb. 29, 2016, for PCT/US2015/053000, 20 pages.
International Search Report and Written Opinion, dated Feb. 29, 2016, for PCT/US2015/053006, 21 pages.
International Search Report and Written Opinion, dated Jan. 13, 2016. For PCT/US2015/053009, 15 pages.

(56) References Cited

OTHER PUBLICATIONS

International Search Report dated Nov. 11, 2014, for International Application No. PCT/US2014/047867, 3 pages.
International Search Report, dated Dec. 13, 2010 for PCT/US2010/035649, 3 pages.
International Search Report, dated Dec. 15, 2010 for PCT/US2010/035658, 3 pages.
International Search Report, dated Dec. 28, 2010 for PCT/US2010/035651, 3 pages.
International Search Report, dated Dec. 30, 2013 for PCT/US2013/058266, 3 pages.
International Search Report, dated Feb. 26, 2014, for PCT/US2013/070794, 3 pages.
International Search Report, dated Feb. 27, 2013, for PCT/US2012/065476, 3 pages.
International Search Report, dated Jan. 14, 2013, for PCT/US2012/052009, 3 pages.
International Search Report, dated Jul. 9, 2009 for PCT/US2009/043171, 5 pages.
International Search Report, dated Jun. 21, 2010, for PCT/US2009/064625, 3 pages.
International Search Report, dated Nov. 19, 2013 for PCT/US2013/052092, 4 pages.
International Search Report, dated Oct. 8, 2012 for PCT/US2012/033059, 3 pages.
International Search Report, dated Sep. 30, 2011, for PCT/US2011/021359, 3 pages.
Japanese Office Action, dated Jan. 6, 2015, for corresponding Japanese Application No. 2011-536564, 6 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Notice of Allowance dated Apr. 11, 2014, for Reed, "Apparatus and Method of Energy Efficient Illumination," U.S. Appl. No. 13/943,537, 9 pages.
Notice of Allowance dated Apr. 12, 2013, for Reed, "Apparatus and Method of Energy Efficient Illumination," U.S. Appl. No. 12/784,093, 9 pages.
Notice of Allowance dated Apr. 27, 2015, for Reed et al., "Apparatus and Method of Operating a Luminaire," U.S. Appl. No. 13/558,191, 8 pages.
Notice of Allowance dated Aug. 29, 2014, for Reed et al., "Adjustable Output Solid-State Lamp With Security Features," U.S. Appl. No. 13/679,687, 9 pages.
Notice of Allowance dated Jul. 1, 2014, for Reed, "Luminaire With Atmospheric Electrical Activity Detection and Visual Alert Capabilities," U.S. Appl. No. 13/786,114, 9 pages.
Notice of Allowance dated Jul. 30, 2014, for Reed, "Apparatus and Method of Energy Efficient Illumination Using Received Signals," U.S. Appl. No. 13/085,301, 5 pages.
Notice of Allowance dated Jul. 7, 2014, for Reed et al., "Apparatus and Method for Schedule Based Operation of a Luminaire," U.S. Appl. No. 13/604,327, 8 pages.
Notice of Allowance dated Jun. 19, 2015, for Reed et al., "Apparatus and Method for Schedule Based Operation of a Luminaire" U.S. Appl. No. 14/552,274, 9 pages.
Notice of Allowance dated Jun. 20, 2014, for Reed et al., "Long-Range Motion Detection for Illumination Control," U.S. Appl. No. 12/784,080, 7 pages.
Notice of Allowance dated Mar. 16, 2017, for U.S. Appl. No. 14/552,274, Reed et al., "Apparatus and Method for Schedule Based Operation of a Luminaire," 9 pages.
Notice of Allowance dated Mar. 24, 2017, for Reed, "Apparatus and Method of Energy Efficient Illumination Using Received Signals," U.S. Appl. No. 14/557,275, 23 pages.
Notice of Allowance dated May 23, 2013, for Reed, "Apparatus and Method of Energy Efficient Illumination," U.S. Appl. No. 12/784,091, 6 pages.
Notice of Allowance dated Nov. 5, 2014, for Reed, "Apparatus and Method of Energy Efficient Illumination," U.S. Appl. No. 14/329,508, 10 pages.
Notice of Allowance dated Oct. 5, 2016 for U.S. Appl. No. 14/869,511, Reed, "Centralized Control of Area Lighting Hours of Illumination," 8 pages.
Notice of Allowance dated Sep. 12, 2013, for Reed, "Electrostatic Discharge Protection for Luminaire," U.S. Appl. No. 13/212,074, 6 pages.
Notice of Allowance dated Sep. 30, 2013, for Reed, "Resonant Network for Reduction of Flicker Perception in Solid State Lighting Systems," U.S. Appl. No. 13/592,590, 9 pages.
Notice of Allowance, dated Oct. 14, 2011, for Reed et al., "Low-Profile Pathway Illumination System," U.S. Appl. No. 12/437,472, 9 pages.
Notice of Allowance, dated Jun. 14, 2017, for U.S. Appl. No. 14/557,275, Reed, "Apparatus and Method of Energy Efficient Illumination Using Received Signals," 2 pages.
Notice of Allowance, dated Jun. 22, 2017, for U.S. Appl. No. 14/816,754, Reed et al., "Apparatus and Method of Operating a Luminaire ," 11 pages.
Office Action dated Apr. 21, 2015, for Reed et al., "Remotely Adjustable Solid-State Lamp," U.S. Appl. No. 13/875,130, 10 pages.
Office Action dated Apr. 23, 2014, for Reed, "Apparatus and Method of Energy Efficient Illumination Using Received Signals," U.S. Appl. No. 13/085,301, 12 pages.
Office Action dated Apr. 24, 2013, for Reed, "Apparatus and Method of Energy Efficient Illumination," U.S. Appl. No. 12/784,091, 12 pages.
Office Action dated Aug. 23, 2016, for Reed, "Apparatus and Method of Energy Efficient Illumination Using Received Signals," U.S. Appl. No. 14/557,275, 23 pages.
Office Action dated Aug. 28, 2014, for Reed, "Apparatus and Method of Energy Efficient Illumination," U.S. Appl. No. 14/329,508, 8 pages.
Office Action dated Aug. 31, 2016, for U.S. Appl. No. 14/869,501, Reed, "Asset Management System for Outdoor Luminaires," 15 pages.
Office Action dated Dec. 17, 2014, for Reed, "Luminaire With Ambient Sensing and Autonomous Control Capabilities," U.S. Appl. No. 13/786,332, 20 pages.
Office Action dated Dec. 21, 2012, for Reed et al., "Long-Range Motion Detection for Illumination Control," U.S. Appl. No. 12/784,080, 26 pages.
Office Action dated Dec. 22, 2014, for Reed et al., "Apparatus and Method of Operating a Luminaire," U.S. Appl. No. 13/558,191, 17 pages.
Office Action dated Dec. 5, 2012, for Reed, "Apparatus and Method of Energy Efficient Illumination," U.S. Appl. No. 12/784,091, 18 pages.
Office Action dated Dec. 5, 2012, for Reed, "Apparatus and Method of Energy Efficient Illumination," U.S. Appl. No. 12/784,093, 13 pages.
Office Action dated Feb. 17, 2017, for U.S. Appl. No. 14/939,856, Reed et al., "Luminaire With Adjustable Illumination Pattern," 13 pages.
Office Action dated Feb. 27, 2014, for Reed et al., "Adjustable Output Solid-State Lamp With Security Features," U.S. Appl. No. 13/679,687, 11 pages.
Office Action dated Jan. 30, 2014, for Reed et al., "Long-Range Motion Detection for Illumination Control," U.S. Appl. No. 12/784,080, 26 pages.
Office Action dated Jul. 22, 2013, for Reed et al., "Long-Range Motion Detection for Illumination Control," U.S. Appl. No. 12/784,080, 29 pages.
Office Action dated Mar. 15, 2013 for Reed et al., "Electrostatic Discharge Protection for Luminaire," U.S. Appl. No. 13/212,074, 11 pages.
Office Action dated Mar. 2, 2015, for Reed et al., "Apparatus and Method for Schedule Based Operations of a Luminaire," U.S. Appl. No. 14/552,274, 7 pages.

(56) References Cited

OTHER PUBLICATIONS

Office Action dated Mar. 26, 2014, for Reed et al., "Apparatus and Method for Schedule Based Operation of a Luminaire," U.S. Appl. No. 13/604,327, 10 pages.
Office Action dated Nov. 27, 2013, for Reed, "Apparatus and Method of Energy Efficient Illumination," U.S. Appl. No. 13/943,537, 8 pages.
Office Action dated Oct. 1, 2013, for Reed, "Apparatus and Method of Energy Efficient Illumination Using Received Signals," U.S. Appl. No. 13/085,301, 11 pages.
Office Action dated Sep. 19, 2016, for U.S. Appl. No. 14/552,274, Reed et al., "Apparatus and Method for Schedule Based Operation of a Luminaire," 9 pages.
Office Action, dated May 5, 2011, for Reed et al., "Low-Profile Pathway Illumination System," U.S. Appl. No. 12/437,472, 24 pages.
Panasonic Electronic Components, "LED Lighting Solutions," 2009, 6 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire" Amendment filed Dec. 7, 2016, for U.S. Appl. No. 14/552,274, 11 pages.
Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Amendment filed Jun. 7, 2016, for U.S. Appl. No. 14/552,274, 14 pages.
Reed et al., "Apparatus and Method of Operating a Luminaire," Amendment filed Mar. 19, 2015, for U.S. Appl. No. 13/558,191, 20 pages.
Reed et al., "Apparatus, Method to Change Light Source Color Temperature with Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement With Passive Cooling," U.S. Appl. No. 61/174,913, filed May 1, 2009, 29 pages.
Reed et al., "Gas-Discharge Lamp Replacement," U.S. Appl. No. 61/052,924, filed May 13, 2008, 32 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," U.S. Appl. No. 61/180,017, filed May 20, 2009, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," U.S. Appl. No. 61/641,781, filed May 2, 2012, 65 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," U.S. Appl. No. 61/333,983, filed May 12, 2010, 57 pages.
Reed, "Asset Management System for Outdoor Luminaires," U.S. Appl. No. 14/869,501, filed Sep. 29, 2015, 57 pages.
Reed, "Asset Management System for Outdoor Luminaires," U.S. Appl. No. 62/082,463, filed Nov. 20, 2014, 56 pages.
Reed, "Centralized Control Area Lighting Hours of Illumination," U.S. Appl. No. 62/057,419, filed Sep. 30, 2014, 39 pages.
Reed, "Centralized Control of Area Lighting Hours of Illumination," Office Action dated Mar. 24, 2016 for U.S. Appl. No. 14/869,511, 31 pages.
Reed, "Detection and Correction of Faulty Photo Controls in Outdoor Luminaires," Notice of Allowance dated May 19, 2016 for U.S. Appl. No. 14/869,492, 9 pages.
Reed, "Detection and Correction of Faulty Photo Controls in Outdoor Luminaires," U.S. Appl. No. 14/869,492, filed Sep. 29, 2015, 71 pages.
Reed, "Detection and Correction of Faulty Photo Controls in Outdoor Luminaires," U.S. Appl. No. 62/068,517, filed Oct. 24, 2014, 47 pages.
Reed, "Detection and Correction of Faulty Photo Controls in Outdoor Luminaires," U.S. Appl. No. 62/183,505, filed Jun. 23, 2015, 71 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," Amendment filed Jun. 17, 2013, for U.S. Appl. No. 13/212,074, 11 pages.
Reed, "High Efficiency Power Controller for Luminaire," U.S. Appl. No. 61/905,699, filed Nov. 18, 2013, 5 pages.
Reed, "Luminaire With Ambient Sensing and Autonomous Control Capabilities," Amendment filed Jul. 23, 2015, for U.S. Appl. No. 13/786,332, 17 pages.
Reed, "Luminaire With Ambient Sensing and Autonomous Control Capabilities," Amendment filed Mar. 13, 2015, for U.S. Appl. No. 13/786,332, 23 pages.

(56) References Cited

OTHER PUBLICATIONS

Reed, "Luminaire With Ambient Sensing and Autonomous Control Capabilities," Notice of Allowance dated Aug. 6, 2015, for U.S. Appl. No. 13/786,332, 8 pages.

Reed, "Luminaire With Ambient Sensing and Autonomous Control Capabilities," Notice of Allowance dated May 4, 2016, for U.S. Appl. No. 14/950,823, 10 pages.

Reed, "Luminaire With Ambient Sensing and Autonomous Control Capabilities," Office Action dated May 29, 2015, for U.S. Appl. No. 13/786,332, 7 pages.

Reed, "Luminaire With Ambient Sensing and Autonomous Control Capabilities," U.S. Appl. No. 14/950,823, filed Nov. 24, 2015, 72 pages.

Reed, "Luminaire With Ambient Sensing and Autonomous Control Capabilities," U.S. Appl. No. 61/728,150, filed Nov. 19, 2012, 83 pages.

Reed, "Luminaire With Atmospheric Electrical Activity Detection and Visual Alert Capabilities," U.S. Appl. No. 61/649,159, filed Aug. 28, 2012, 52 pages.

Reed, "Luminaire With Switch-Mode Converter Power Monitoring," U.S. Appl. No. 61/723,675, filed Nov. 7, 2012, 73 pages.

Reed, "Photocontrol for Luminaire Consumes Very Low Power," U.S. Appl. No. 61/849,841, filed Jul. 24, 2013, 41 pages.

Reed, "Resonant Network for Reduction of Flicker Perception in Solid State Lighting Systems," U.S. Appl. No. 61/527,029, filed Aug. 24, 2011, 41 pages.

Reed, "Solid State Hospitality Lamp," U.S. Appl. No. 61/692,619, filed Aug. 23, 2012, 32 pages.

Reed, "Solid State Lighting, Drive Circuit and Method of Driving Same," U.S. Appl. No. 61/640,963, filed May 1, 2012, 24 pages.

Reed, "Systems, Methods, and Apparatuses for Using a High Current Switching Device as a Logic Level Sensor," U.S. Appl. No. 61/764,395, filed Feb. 13, 2013, 48 pages.

Reed, "Luminaire With Adjustable Illumination Pattern," U.S. Appl. No. 62/114,826, filed Feb. 11, 2015, 68 pages.

Renesas Electronics, "Zener Diodes for Surge Absorption—Applications of high-intensity LED," Apr. 2010, 1 page.

Renn et al., "Solid State Lighting Device and Method Employing Heat Exchanger Thermally Coupled Circuit Board," U.S. Appl. No. 61/357,421, filed Jun. 22, 2010, 49 pages.

Tyco Electronics, "Circuit Protection," retrieved Jun. 10, 2011, retrieved from http://www.tycoelectronics.com/en/products/circuit-protection.html, 2 pages.

Vendetti et al., "Systems and Methods for Controlling Luminaire Wireless Network Using Smart Appliance," U.S. Appl. No. 62/458,970, filed Feb. 14, 2017, 50 pages.

Vendetti et al., "Systems and Methods for Controlling Outdoor Luminaire Wireless Network Using Smart Appliance," U.S. Appl. No. 15/895,439, filed Feb. 13, 2018, 50 pages.

Written Opinion dated Nov. 11, 2014, for International Application No. PCT/US2014/047867, 5 pages.

Written Opinion, dated Dec. 13, 2010 for PCT/US2010/035649, 4 pages.

Written Opinion, dated Dec. 15, 2010 for PCT/US2010/035658, 3 pages.

Written Opinion, dated Dec. 28, 2010 for PCT/US2010/035651, 3 pages.

Written Opinion, dated Dec. 30, 2013 for PCT/US2013/058266, 8 pages.

Written Opinion, dated Feb. 26, 2014, for PCT/US2013/070794, 10 pages.

Written Opinion, dated Feb. 27, 2013, for PCT/US2012/065476, 8 pages.

Written Opinion, dated Jan. 14, 2013, for PCT/US2012/052009, 5 pages.

Written Opinion, dated Jul. 9, 2009 for PCT/US2009/043171, 8 pages.

Written Opinion, dated Jun. 21, 2010 for PCT/US2009/064625, 5 pages.

Written Opinion, dated Nov. 19, 2013 for PCT/US2013/052092, 7 pages.

Written Opinion, dated Oct. 8, 2012 for PCT/US2012/033059, 3 pages.

Written Opinion, dated Sep. 30, 2011, for PCT/US2011/021359, 4 pages.

\* cited by examiner

SYSTEMS AND METHODS FOR OUTDOOR LUMINAIRE WIRELESS CONTROL

BACKGROUND

Technical Field

The present disclosure relates to illumination, and more particularly to control of illumination devices and systems.

Description of the Related Art

Luminaires enjoy widespread use in a variety of industrial, commercial, and municipal applications. Such applications can include general or area lighting of workspaces, roadways, parking lots, and the like. Multiple luminaires are typically arranged in patterns and positioned at intervals sufficient to provide a minimum overall level of illumination across the area of interest. For example, luminaires may be spaced at intervals along a driveway in a multilevel parking garage to provide an overall level of illumination that permits safe ingress and egress by pedestrians as well as permits safe operation of motor vehicles within the parking garage. In a similar manner, luminaires may be spaced at intervals throughout a commercial center parking lot to promote safe operation of motor vehicles, permit safe ingress and egress by customers, and foster a sense of safety and well-being for business patrons within the commercial center. Similarly, a number of luminaires may be spaced along a roadway to provide a level of illumination permitting safe operation of motor vehicles on the roadway and, where applicable, safe passage of pedestrians on sidewalks adjoining the roadway.

To simplify power distribution and control wiring, such luminaires may be organized into groups or similar hierarchical power and control structures. For example, multiple luminaires along a roadway may be grouped together on a common power circuit that is controlled using a single, centralized controller to collectively adjust the luminous output of all of the luminaires in the group. In another instance, multiple luminaires within a parking garage may be controlled using a single photocell mounted on the exterior of the parking garage. Such installations may however compromise operational flexibility for ease of installation and simplicity of operation.

Energy conservation has become of ever-increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, fluorescent lamps such as high-intensity discharge (HID) lamps (e.g., mercury vapor lamps, high-pressure sodium lamps, metal halide lamps).

There appears to be at least two primary approaches to reducing energy consumption associated with lighting systems. One approach employs higher efficiency light sources. The other approach selectively provides light only when needed.

Use of higher efficiency light sources may, for instance, include replacing incandescent lamps with fluorescent lamps or even with solid-state light sources (e.g., light emitting diodes (LEDs), organic LEDs (OLEDs), polymer LEDs (PLEDs)) to increase energy efficiency. In some instances, these higher efficiency light sources may present a number of problems. For example, fluorescent light sources may take a relatively long time after being turned ON to achieve their full rated level of output light or illumination. Such light sources also typically have a high energy consumption during warm-up. Many higher efficiency light sources emit light with a low color rendering index (CRI). For reference, sunlight has a CRI of 100 and represents "ideal light" which contains a continuous spectrum of visible radiation. Low CRI light is less pleasing to the human eye. Surfaces illuminated with low CRI light may not be perceived in their "true" color. Low CRI light makes it more difficult to discern details, often requiring a higher level of output light or illumination to discern details that would otherwise be discernable in high CRI light. Further, higher efficiency light sources may require additional circuitry (e.g., ballasts) and/or thermal management techniques (e.g., passive or active cooling).

Providing illumination only when needed can be achieved manually by a user of the lighting system, or automatically by a control mechanism. Automatic control mechanisms generally fall into two broad categories, timers and environmental sensors. Timer based control mechanisms turn light sources ON and OFF based on time. The times are typically user configurable. Such relies on the user to account for changes or variations in the length of daylight in a 24 hour cycle which may occur throughout a year. Very often, timer based control mechanisms are set once and never updated.

Environmental sensor based control mechanisms sense light or illumination levels and/or motion or proximity. Light or illumination level based control mechanisms are commonly referred to as dusk-to-dawn sensors. Dusk-to-dawn light or illumination level based control mechanisms turn the light sources ON when a level of light or illumination in an environment falls below a turn ON threshold (i.e., dusk threshold), and turn the light sources OFF when the level of light or illumination exceeds a turn OFF threshold (i.e., dawn threshold). Light or illumination level based control subsystems advantageously automatically accommodate changes in length of day light throughout the year.

Example outdoor lighting systems may include a number of individual luminaires mounted on poles and that are each controlled by a photocontrol (or other mechanism) that controls the AC power to the luminaire for daytime and nighttime operation. This is often accomplished through a standard wired 3-pin twist-lock receptacle (e.g., ANSI C136.10 compliant receptacle) on the luminaire that mates with a compatible photocontrol plug interface (e.g., ANSI C136.10 compliant plug). The photocontrol switches the luminaire power ON/OFF based on the dusk/dawn events. There are also scenarios where groups of luminaires are controlled together by an AC contactor that activates power to the group as a whole, and controlled by a photocontrol, timer, etc.

More elaborate lighting networks may cover a large area, such as a city, and may include numerous individual luminaires outfitted with network communication nodes that can each be controlled by a remotely located central management system (CMS). Communication between the luminaires and the CMS may be enabled through mesh or mobile wireless networks, or through powerline communications. The network nodes may additionally offer more capabilities to control the luminaires, such as dimming to specific levels and varying illumination with time, metering of the power being consumed by the luminaire, maintenance alerts regarding luminaire failure or malfunction, and ability to commission and/or decommission the luminaires remotely.

BRIEF SUMMARY

A wireless adapter system may be summarize as including: an adapter system physical luminaire interface that is physically coupleable to a physical luminaire interface of a luminaire to receive alternating current (AC) power from the luminaire; a first adapter system transceiver that in operation wirelessly communicates with a luminaire transceiver of the luminaire; at least one processor communicatively coupled to the first adapter system transceiver; and at least one nontransitory processor-readable storage medium operatively coupled to the at least one processor and storing at least one of data or instructions which, when executed by the at least one processor, cause the at least one processor to: cause the first adapter system transceiver to at least one of: wirelessly send data or instructions to the luminaire; or wirelessly receive data or instructions from the luminaire.

The adapter system physical luminaire interface may include a 3-wire interface comprising an AC line connection, an AC neutral connection, and an AC switched line connection. The adapter system physical luminaire interface may include a twist lock plug. The adapter system physical luminaire interface may be selectively physically coupleable to a control node physical node interface of a control node in an integrated housing.

The wireless adapter system may include an adapter system physical node interface that is selectively physically coupleable to a control node physical node interface of a control node. The adapter system physical node interface may include one of a 5-pin receptacle interface or a 7-pin receptacle interface. In operation, the adapter system physical node interface may provide AC power from the physical luminaire interface of the luminaire to the control node physical node interface of the control node. In operation, the adapter system physical luminaire interface may couple an AC line connection, a neutral connection, and a switched line connection of the luminaire to the control node physical node interface of the control node. In operation, the adapter system physical node interface may enable power switching to and power measurement of the luminaire by the control node.

The at least one processor of the wireless adapter system may: receive, via the adapter system physical node interface, at least one of instructions or data; and cause the first adapter system transceiver to wirelessly send the received at least one of instructions or data to the luminaire in a format that is readable by the luminaire. The at least one processor may: receive, via the adapter system transceiver, at least one of instructions or data from the luminaire; and send, via the adapter system physical node interface, the received at least one of instructions or data to the control node. The at least one processor may include at least one of an analog dimming receiver or a digitally addressable lighting interface (DALI) transceiver. The adapter system physical luminaire interface, adapter system physical node interface, and the first adapter system transceiver may all be disposed in an adapter system housing.

The wireless adapter system may include a second adapter system transceiver that in operation communicates wirelessly with an external device over a wireless network. The at least one processor may: receive, via the second adapter system transceiver, at least one of instructions or data; and cause the first adapter system transceiver to wirelessly send the received at least one of instructions or data to the luminaire in a format that is readable by the luminaire. The at least one processor may: receive, via the first adapter system transceiver, at least one of instructions or data from the luminaire; and send, via the second adapter system transceiver, the received at least one of instructions or data to an external device over at least one communications network.

A method of operating a luminaire may be summarized as including: providing a wireless adapter system comprising an adapter system physical luminaire interface, a first adapter system transceiver, and at least one processor communicatively coupled to the first adapter system transceiver; physically coupling the adapter system physical luminaire interface of the wireless adapter system to a luminaire physical node interface of a luminaire to receive alternating current (AC) power from the luminaire; and causing, by the at least one processor, the first adapter system transceiver to at least one of wirelessly send data or instructions to the luminaire or wirelessly receive data or instructions from the luminaire.

The adapter system physical luminaire interface may include a 3-wire interface comprising an AC line connection, an AC neutral connection, and an AC switched line connection, and physically coupling the adapter system physical luminaire interface of the wireless adapter system to a luminaire physical node interface may include physically coupling the AC line connection, the AC neutral connection, and the AC switched line connection to circuitry of the luminaire. The adapter system physical luminaire interface may include a twist lock plug and physically coupling the adapter system physical luminaire interface of the wireless adapter system to a luminaire physical node interface may include physically coupling the twist lock plug to a receptacle of the luminaire. The adapter system physical luminaire interface may be selectively physically coupleable to a control node physical node interface of a control node in an integrated housing.

The wireless adapter system may include an adapter system physical node interface, and the method may further include physically coupling the adapter system physical node interface to a control node physical node interface of a control node. The adapter system physical node interface may include one of a 5-pin receptacle interface or a 7-pin receptacle interface, and physically coupling the adapter system physical node interface to a control node physical node interface of a control node may include physically coupling the one of a 5-pin receptacle interface or the 7-pin receptacle interface to a plug of the control node. The method may include providing, via the adapter system physical luminaire interface, AC power from the physical luminaire interface of the luminaire to the control node physical node interface of the control node. The method may include receiving, by the at least one processor via the adapter system physical node interface, at least one of instructions or data; and causing, by the at least one processor, the first adapter system transceiver to wirelessly send the received at least one of instructions or data to the luminaire in a format that is readable by the luminaire. The method may include receiving, by the at least one processor via the first adapter system transceiver, at least one of instructions or data from the luminaire; and sending, by the at least one processor via the adapter system physical node interface, the received at least one of instructions or data to the control node.

The wireless adapter system may include a second adapter system transceiver, and the method may further include communicating, via the second adapter system transceiver, wirelessly with an external device over a wireless network. The method may include receiving, by the at least one processor via the second adapter system transceiver, at least one of instructions or data; and causing, by the at least one processor, the first adapter system transceiver to wirelessly send the received at least one of instructions or data to the luminaire in a format that is readable by the luminaire. The method may include receiving, by the at least one processor via the first adapter system transceiver, at least one of instructions or data from the luminaire; and sending, by the at least one processor via the second adapter system transceiver, the received at least one of instructions or data to an external device over at least one communications network.

An illumination system may be summarized as including: a plurality of terminal luminaires, each of the terminal luminaires including: at least one terminal luminaire processor; at least one light source operatively coupled to the at least one terminal luminaire processor; a terminal luminaire transceiver operatively coupled to the at least one terminal luminaire processor, in operation the terminal luminaire transceiver communicates via a first communications protocol; and at least one nontransitory processor-readable storage medium operatively coupled to the at least one terminal luminaire processor and storing at least one of data or instructions; a gateway luminaire including: at least one gateway luminaire processor; at least one light source operatively coupled to the at least one gateway luminaire processor; a first gateway luminaire transceiver operatively coupled to the at least one gateway luminaire processor, in operation the first gateway luminaire transceiver communicates via the first communications protocol; a second gateway luminaire transceiver operatively coupled to the at least one gateway luminaire processor, in operation the second gateway luminaire transceiver communicates via a second communications protocol, the second communications protocol different from the first communications protocol; and at least one nontransitory processor-readable storage medium operatively coupled to the at least one gateway luminaire processor and storing at least one of data or instructions which, when executed by the at least one gateway luminaire processor, cause the at least one gateway luminaire processor to: receive, via the second gateway luminaire transceiver, at least one of instructions or data from at least one mobile system; and send, via the first gateway luminaire transceiver, the received at least one of instructions or data to at least one of the plurality of terminal luminaires.

At least some of the plurality of terminal luminaires may communicate with other of the plurality of terminal luminaires using the first communications protocol via respective terminal luminaire transceivers. Each of the plurality of terminal luminaires may communicate with at least one gateway luminaire using the first communications protocol via respective terminal luminaire transceivers. The first and second communication protocols may be wireless communications protocols, the first and second communications protocols may have first and second ranges, respectively, and the first range may be greater than the second range. The at least one gateway luminaire processor: may receive, via the second gateway luminaire transceiver, at least one of commissioning data, decommissioning data, dimming level data, light schedule data, firmware update data or operational parameter data from the at least one mobile system. The at least one gateway luminaire processor: may receive, via the first gateway luminaire transceiver, at least one of instructions or data from at least one of the plurality of terminal luminaires; and may send, via the second gateway luminaire transceiver, the received at least one of instructions or data to the at least one mobile system. The illumination system may further include: a mobile system including: at least one mobile system processor; a first mobile system transceiver operatively coupled to the at least one mobile system processor, in operation the first mobile system transceiver communicates via the second communications protocol; and at least one nontransitory processor-readable storage medium operatively coupled to the at least one mobile system processor and storing at least one of data or instructions which, when executed by the at least one mobile system processor, may cause the at least one mobile system processor to: send, via the first mobile system transceiver, at least one of instructions or data to the gateway luminaire; or receive, via the first mobile system transceiver, at least one of instructions or data from the gateway luminaire. The mobile system may include: a second mobile system transceiver operatively coupled to the at least one mobile system processor, wherein the at least one mobile system processor: may send, via the second mobile system transceiver, at least one of instructions or data to at least one remote processor-based device; or may receive, via the second mobile system transceiver, at least one of instructions or data from the remote processor-based device. The second mobile system transceiver may communicate via the first communications protocol. The second mobile system transceiver may communicate via a third communications protocol, the third communications protocol different from the first and second communications protocols. The third communications protocol may include a mobile telecommunications protocol. The at least one terminal luminaire processor: may receive, via the terminal luminaire transceiver, sensor data from at least one sensor; and may send, via the terminal luminaire transceiver, the received sensor data to the gateway luminaire. The at least one terminal luminaire processor: may store the sensor data temporarily in the nontransitory processor-readable storage medium of the terminal luminaire. The at least one sensor may include at least one of a motion sensor, a temperature sensor, a humidity sensor, a carbon monoxide sensor, a noise sensor, or a gunshot detection sensor. The illumination system may further include: a data storage device, including: at least one data storage device processor; a data storage device transceiver operatively coupled to the at least one data storage device processor; and at least one data storage device nontransitory processor-readable storage medium operatively coupled to the at least one data storage device processor and storing at least one of data or instructions which, when executed by the at least one data storage device processor, may cause the at least one data storage device processor to: receive, via the data storage device transceiver, sensor; and store the received sensor data in the at least one data storage device nontransitory processor-readable storage medium. The at least one gateway luminaire processor: may receive, via the first gateway luminaire transceiver, sensor data from at least one of the terminal luminaires; and may send, via the second gateway luminaire transceiver, the received sensor data to the at least one mobile system. The at least one sensor may include at least one of a motion sensor, a temperature sensor, a humidity sensor, a carbon monoxide sensor, a noise sensor, or a gunshot detection sensor.

A method of operating an illumination system, the illumination system including a plurality of terminal luminaires each including a terminal luminaire transceiver which communicates via a first communications protocol and a gateway luminaire including first and second gateway transceivers which communicate via first and second communications protocols, respectively, the method may be summarized as including: receiving, via the second gateway luminaire transceiver, at least one of instructions or data from at least one mobile system via the second communications protocol; and sending, via the first gateway luminaire transceiver, the received at least one of instructions or data to at least one of the plurality of terminal luminaires via the first communications protocol.

Receiving at least one of instructions or data from at least one mobile system may include receiving at least one of commissioning data, decommissioning data, dimming level data, light schedule data, firmware update data or operational parameter data from the at least one mobile system. The method may further include: receiving, via the first gateway luminaire transceiver, luminaire information from at least one of the terminal luminaires, the luminaire information including at least one of identifier information, operational information, or maintenance information for at least one of the terminal luminaires; and sending, via the second gateway luminaire transceiver, the received luminaire information to the at least one mobile system. The method may further include: receiving, via the first gateway luminaire transceiver, at least one of instructions or data from at least one of the plurality of terminal luminaires; and sending, via the second gateway luminaire transceiver, the received at least one of instructions or data to the at least one mobile system. The method may further include: sending, via a first mobile system transceiver of a mobile system, at least one of instructions or data to the gateway luminaire via the second communications protocol; or receiving, via the first mobile system transceiver of the mobile system, at least one of instructions or data from the gateway luminaire via the second communications protocol. The method may further include: sending, via a second mobile system transceiver of the mobile system, at least one of instructions or data to at least one remote processor-based device; or receiving, via the second mobile system transceiver of the mobile system, at least one of instructions or data from the gateway luminaire. Sending or receiving via the second mobile system transceiver may include sending or receiving at least one of instructions or data via the first communications protocol. Sending or receiving via the second mobile system transceiver may include sending or receiving at least one of instructions or data via a third communications protocol, the third communications protocol different from the first and second communications protocols. Sending or receiving via the second mobile system may include sending or receiving at least one of instructions or data via the third communications protocol, the third communications protocol including a mobile telecommunications protocol. The method may further include: receiving, via a data storage device transceiver communicatively coupled to a data storage device, sensor data; and storing the received sensor data in at least one data storage device nontransitory processor-readable storage medium of the data storage device. The method may further include: receiving, via a terminal luminaire transceiver of one of the plurality of terminal luminaires, sensor data from at least one sensor; and sending, via the terminal luminaire transceiver, the received sensor data to the gateway luminaire. Receiving sensor data from the at least one sensor may include receiving sensor data from at least one sensor which includes at least one of: a motion sensor, a temperature sensor, a humidity sensor, a carbon monoxide sensor, a noise sensor, or a gunshot detection sensor. The method may further include: receiving, via first gateway luminaire transceiver, sensor data from at least one of the terminal luminaires; and sending, via the second gateway luminaire transceiver, the received sensor data to the at least one mobile system. Receiving sensor data may include receiving sensor data which originates from at least one of: a motion sensor, a temperature sensor, a humidity sensor, a carbon monoxide sensor, a noise sensor, or a gunshot detection sensor.

An illumination system may be summarized as including: a plurality of terminal luminaires, each of the terminal luminaires including: at least one terminal luminaire processor; at least one light source operatively coupled to the at least one terminal luminaire processor; a terminal luminaire transceiver operatively coupled to the at least one terminal luminaire processor, in operation the terminal luminaire transceiver communicates via a first communications protocol; and at least one nontransitory processor-readable storage medium operatively coupled to the at least one terminal luminaire processor and storing at least one of data or instructions; a gateway luminaire including: at least one gateway luminaire processor; at least one light source operatively coupled to the at least one gateway luminaire processor; a first gateway luminaire transceiver operatively coupled to the at least one gateway luminaire processor, in operation the first gateway luminaire transceiver communicates via the first communications protocol; a second gateway luminaire transceiver operatively coupled to the at least one gateway luminaire processor, in operation the second gateway luminaire transceiver communicates via a second communications protocol, the second communications protocol different from the first communications protocol; and at least one nontransitory processor-readable storage medium operatively coupled to the at least one gateway luminaire processor and storing at least one of data or instructions which, when executed by the at least one gateway luminaire processor, cause the at least one gateway luminaire processor to: receive, via the first gateway luminaire transceiver, at least one of instructions or data from at least one of the plurality of terminal luminaires; and send, via the second gateway luminaire transceiver, the received at least one of instructions or data to at least one mobile system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
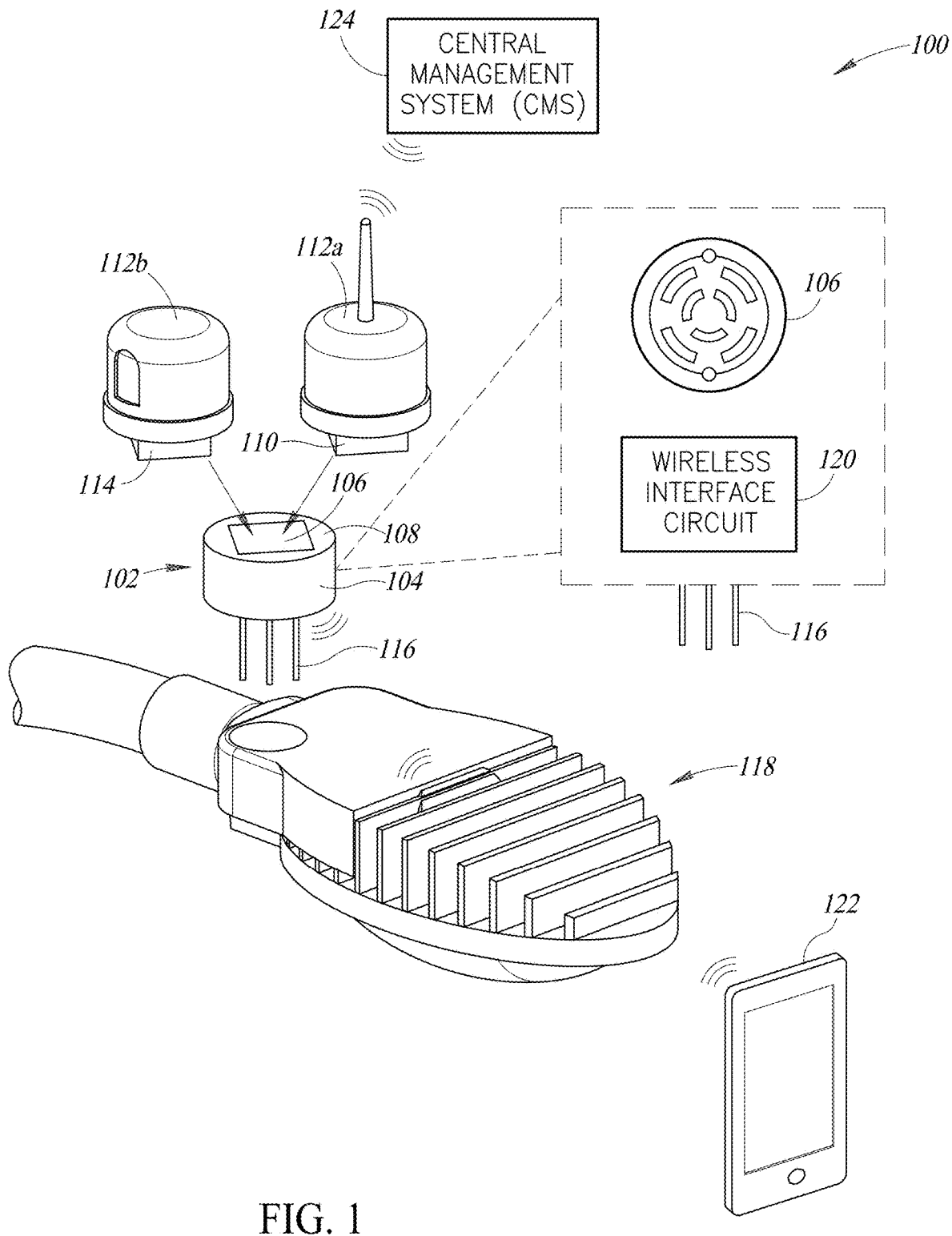
FIG. 1 is a pictorial diagram of an illumination system that includes a wireless adapter system, according to at least one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

More elaborate lighting networks may cover a large area, such as a park, highway, or city, and may include numerous individual luminaires outfitted with network communication nodes or "lamp control nodes" that can each be controlled by a remotely located central management system (CMS). Communication between the luminaires and the CMS may be enabled through mesh or mobile wireless networks, or through powerline communications. In addition to photo-control capability, the lamp control nodes may additionally offer more capabilities to control the luminaires, such as dimming to specific levels and varying illumination with time, metering of the power being consumed by the luminaire, maintenance alerts regarding luminaire failure or malfunction, and ability to commission and/or decommission the luminaires remotely.

These extended capabilities are accomplished through an expanded version of the three wire twist-lock receptacle that includes more interface pins (e.g., 5 or 7 total pins) and wires for dimming control and for reading status signals from the luminaire. This expanded version is described in the ANSI C136.41 standard. The extra pins or pads allow dimming through a standard 0-10 V analog interface or through a digital lighting protocol referred to as Digitally Addressable Lighting Interface (DALI) that typically interfaces to the power control electronics in the luminaire. The extra control lines usually route to specialized lighting drivers of the luminaire that recognize the specific control input appropriately.

A problem arises when an existing street light luminaire is being upgraded in the field to the 5-pin or 7-pin (e.g., ANSI C136.41) network control capabilities from the traditional 3-pin interface (e.g., ANSI C136.10). At a minimum, the 3-pin receptacle on the luminaire needs to be replaced by the 5-pin or 7-pin version and the wires connected appropriately. In most cases, the existing driver electronics for the lighting of the luminaire have no connections available for the extra control lines from the receptacle unless the driver was originally specified to be a more advanced model. The result is that the driver of the luminaire is also replaced and is likely a major percentage of the cost of the entire luminaire, not including the labor involved in the replacement. This would be a normal scenario in upgrading many of the already-deployed LED street and roadway luminaires to date, as the network control rollouts are in their infancy with few deployed.

The problem is compounded for decorative post top street and area lights, most of which have not yet converted to LED lighting. The majority of these post top lights have internal electronics housed at the base of the light fixture or at the base of the pole. They often include the standard 3-pin receptacle and photocontrol either on top of the post top fixture, or tucked away inside with the other electronics with a peep hole for the photocontrol sensor. In this scenario, the only viable solution for upgrading the luminaire to LED lighting and including the ability to support the 5-pin or 7-pin control node is to replace the entire luminaire with a modern unit. This can be very expensive, especially for highly ornate fixtures, and it may be impossible to duplicate the look of older, historical luminaires with modern replacements.

One or more implementations of the present disclosure provide systems, methods and articles which leverage the wireless communication capability present in wireless-enabled luminaires where the lamps include a short-range wireless transceiver (e.g. Bluetooth® transceiver) and can be controlled by a CMS and/or a smart appliance (e.g., smartphone, tablet computer, laptop computer). In at least some implementations, the wireless capability embedded in the luminaire may be paired with a second compatible wireless interface to standard plug-in photocontrols and wireless lamp control nodes, or any wireless-enabled control device (e.g., secondary communications network node, secondary control appliance) of any form factor within proximity of the luminaire.

In at least some implementations, a wireless adapter system may be provided that replaces the standard 3-pin, 5-pin or 7-pin wired receptacle. The wireless adapter system may include a 3-wire interface (e.g., line, neutral, switched line) to the luminaire which provides power to the wireless adapter system. The wireless adapter system may include a receptacle interface (e.g., 5-pin, 7-pin) that receives a plug (e.g., 3-pin, 5-pin, 7-pin) of a control device, such as photocontrol or a networked control node. The wireless adapter system may also include a wireless interface circuit that communicates control, status or other data between the connected control device and the luminaire. The wireless adapter system may accumulate information (e.g., operational status, power draw) from multiple luminaires of a secondary communications network or communications subnetwork and provide the accumulated information or an aggregation of the accumulated information to a central management system via a primary communications network (e.g., mobile or cellular communications network). Additionally or alternatively, the wireless adapter system may accumulate instructions received from a central management system via a primary communications network (e.g., mobile or cellular communications network) and provide the instructions one or more luminaries via a secondary communications network or communications subnetwork. Thus, the wireless adapter system advantageously makes a plurality or group of luminaries appear as a single luminaire to the central management system. In at least some implementations, the wireless interface circuit may replace some or all of the control lines from any control device while offering the same capabilities available to the smart appliance.

FIG. 1 shows an illumination system 100 which includes a wireless-enabled adapter system 102, which may be a specific "plug-in" embodiment of a secondary communications network node or secondary control appliance. The adapter system 102 includes a housing 104 that includes a receptacle interface 106 on a top surface 108 thereof. As a non-limiting example, the receptacle interface 106 may be a 5-pin or a 7-pin receptacle interface (e.g., ANSI C146.41) that receives a 5-pin or 7-pin plug 110 of a networked control node 112a or 3-pin plug 114 of a standard photocontrol 112b, collectively referred to herein as control nodes 112. The adapter system 102 includes a 3-wire interface 116 (or physical node interface) that may be electrically coupled to circuitry of a luminaire 118, thereby replacing a standard 3-wire luminaire receptacle of the luminaire. The luminaire 118 may comprise an AreaMax™ LED area lighting fixture available from Evluma of Renton, Wash., for example. The 3-wire interface 116 provides AC power from the luminaire 118 to the adapter system 102, and also provides AC power to the control node 112 (e.g., the photocontrol 112b, the networked control node 112a) coupled to the receptacle interface 106 of the wireless-enabled adapter system 102. The wires of the 3-wire interface 116 may include line, neutral, and a switched line, for example.

The wireless adapter system 102 also includes a short-range wireless interface circuit 120 (e.g., Bluetooth® radio, WiFi® radio) disposed in the housing 104. In operation, the wireless adapter system 102 receives via the wired receptacle interface 106 ON/OFF, dimming, or other commands or data from the control node 112 and autonomously interprets or translates those signals using one or more processors, for example. The received interpreted signals are translated into wireless signals that are transmitted by the wireless interface circuit 120 of the adapter system 102 and received by the wireless-enabled luminaire 118, as well as by other wireless-enabled luminaire within a range of the wireless signals. Similarly, the adapter system 102 may receive via the wireless interface circuit 120 signals encoding data or instructions from the luminaire 118, as well as from other wireless-enabled luminaire within a range of the wireless signals, and may interpret and transmit the signals to the control node 112 via the wired receptacle interface 106. As described herein, the adapter system 102 may accumulate, aggregate and store data or information received from one or a plurality of luminaires 118, and/or provide an accumulated or aggregated representation of the information to a remotely located central management system (CMS) 124. The instructions or commands may be in the form of switch-controlled ON/OFF signals, analog dimming with dim-to-off capability (e.g., 0-10 V), digital control and status commands (e.g., DALI), or any other types of signals.

As noted above, the luminaire 118, as well as other luminaires within the vicinity, may contain one or more short-range wireless network interfaces (e.g., Bluetooth®, WiFi) that allow the luminaire to communicate with wireless adapter system 102 disposed proximate (e.g., within 150 meters, within 100 meters, within 50 meters) the luminaires. Additionally, or alternatively, a mobile system 122 may wireless communicate via the wireless adapter system 102. Although only one luminaire is shown for explanatory purposes, it should be appreciated than in practice some applications may have a plurality of luminaires (e.g., 2 luminaires, 100 luminaires, 1000 luminaires).

The control node 112a may communicate instructions and/or data with the CMS 124 via a network. The control node 112a may be a specific "plug-in" embodiment of a primary network control node or primary network node. As an example, the wireless-enabled adapter system 102 may communicate with the CMS 124 via an access point (e.g., cellular tower, WIFI® access point) communicatively coupled to the CMS via one or more suitable data communications networks (e.g., mobile or cellular telecommunications network(s), Internet).

Figure 2:
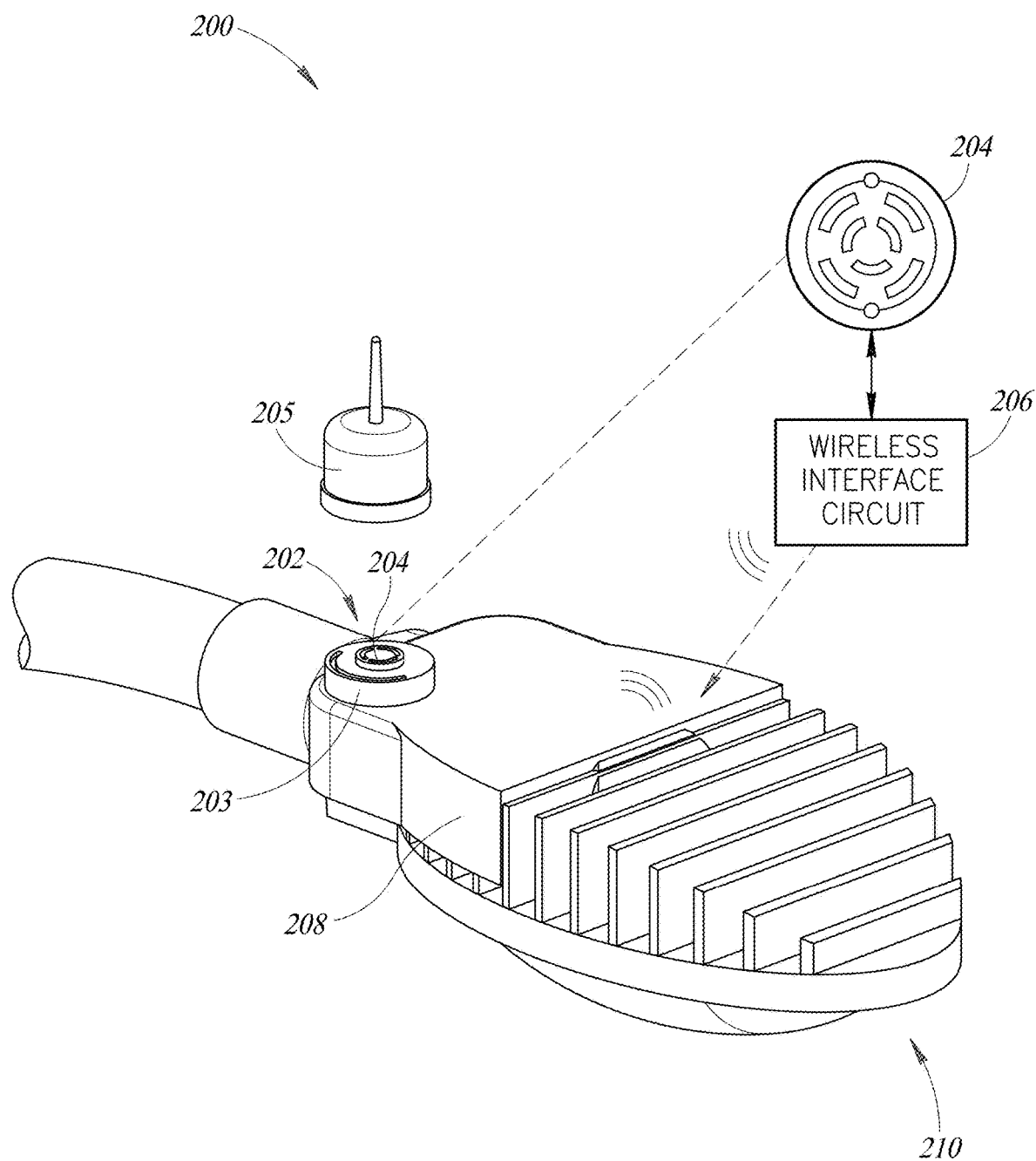
FIG. 2 is a pictorial diagram of an illumination system that includes a wireless adapter system having a receptacle interface disposed in an adapter system housing and a wireless interface circuit disposed in a housing of a luminaire, according to one illustrated implementation.

In the implementation shown in FIG. 1, the wireless-enabled adapter system 102 includes the wired receptacle interface 106 and the wireless interface circuit 120 (e.g., Bluetooth® radio, WiFi® radio) in the single housing 104. FIG. 2 shows an implementation of an illumination system 200 that includes a wireless-enabled adapter system 202 that is implemented as two or more discrete entities comprising a wired receptacle interface 204 (e.g., 5-pin, 7-pin) disposed within a housing 203 of the adapter system 202 and a wireless interface circuit 206 positioned within a housing 208 of a wireless-enabled luminaire 210. In this implementation, the wired receptacle interface 204 includes a receptacle interface (e.g., 5-pin, 7-pin) that selectively receives a plug of a control node 205 (e.g., networked control node, photocontrol). The wired receptacle interface 204 is coupled to a 3-wire interface that connects to a circuit board in the luminaire housing 208, and the wireless interface circuit 206 wirelessly communicates with a wireless module of the wireless-enabled luminaire(s) 210 inside respective luminaire housings 208. Thus, the functionality of the wireless adapter system 102 of FIG. 1 is achieved without requiring the wireless interface circuit 206 (or other circuitry) to be disposed in the housing 203 of the adapter system 202, thereby allowing the housing 203 of the adapter system 202 to be smaller than the housing 104 of the adapter system 102 of FIG. 1.

Figure 3A:
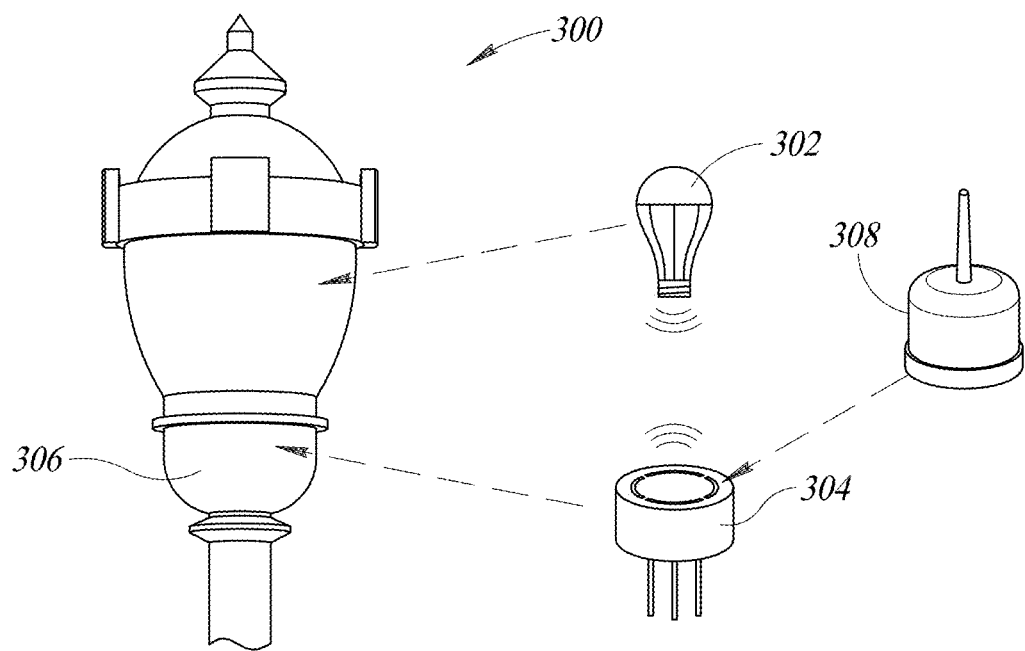
FIG. 3A is a pictorial diagram of a post top luminaire fixture that includes a wireless LED bulb therein and a wireless-enabled adapter system disposed inside a housing of the fixture, according to one illustrated implementation
Figure 3B:
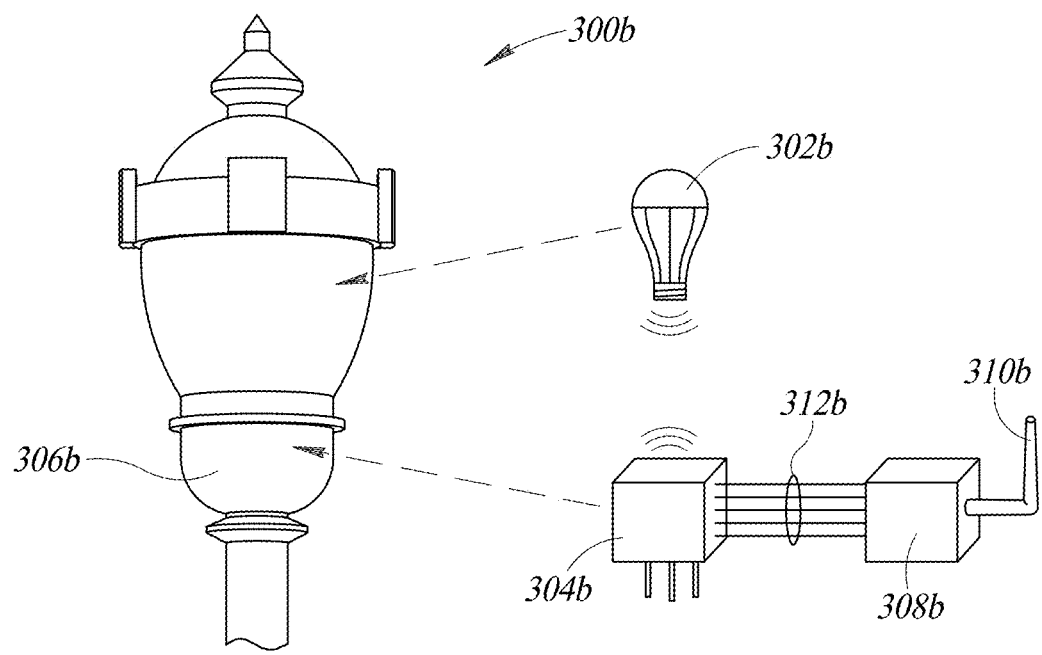
FIG. 3B is a pictorial diagram of a post top luminaire fixture that includes a wireless LED bulb there and a wireless-enabled adapter system disposed inside a housing of the fixture that is hardwired to a control node, according to one illustrated implementation.
Figure 4:
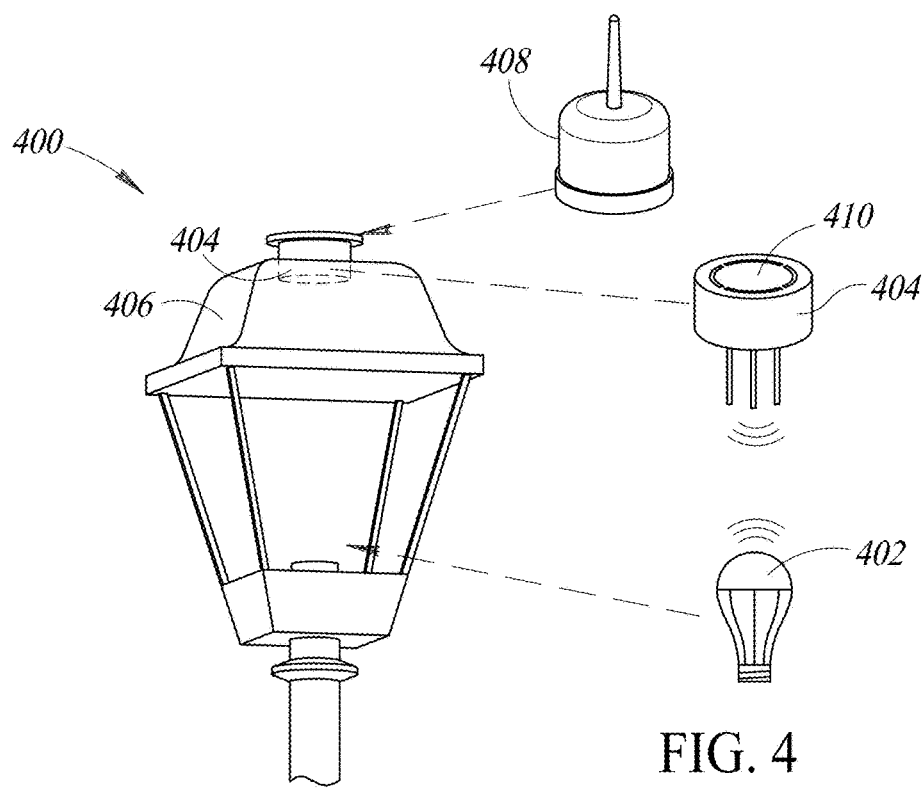
FIG. 4 is a pictorial diagram of a post top luminaire fixture that includes a wireless LED bulb and a wireless-enabled adapter system disposed on a top portion of a housing of the fixture, according to one illustrated implementation.
Figure 5:
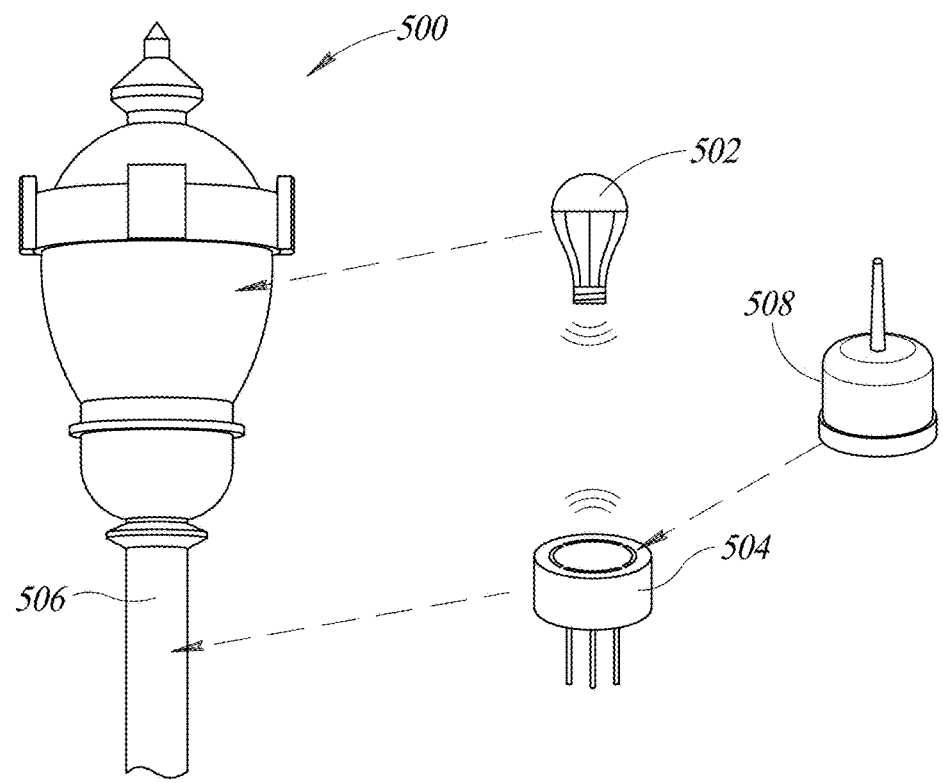
FIG. 5 is a pictorial diagram of a post top luminaire fixture that includes a wireless LED bulb and a wireless adapter system that is mounted to a pole that supports the fixture, according to one illustrated implementation.

FIGS. 3-5 show various mounting options for the wireless adapter systems of the present disclosure in decorative post top luminaires. In particular, FIG. 3A shows a post top luminaire fixture 300 that includes a wireless LED bulb 302 therein and a wireless-enabled adapter system 304 disposed inside a housing 306 of the fixture 300. A control node 308 is shown being connected to the wireless-enabled adapter system 304. FIG. 3B shows a post top luminaire fixture 300b that includes a wireless LED bulb 302b therein and a wireless-enabled adapter system 304b disposed inside a housing 306b of the fixture 300b. A control node 308b that includes an external antenna 310b is shown with a hardwired connection 312b to the wireless-enabled adapter system 304b instead of a plug-in node. FIG. 4 shows a post top luminaire fixture 400 that includes a wireless LED bulb 402 and a wireless-enabled adapter system 404 disposed on a top portion of a housing 406 of the fixture 400. A control node 408 is shown as being connected to a receptacle interface 410 of the wireless-enabled adapter system 404. FIG. 5 shows a post top luminaire fixture 500 that includes a wireless LED bulb 502 and a wireless adapter system 504 that is mounted to a pole 506 that supports the luminaire fixture 500. A control node 508 is shown being connected to the wireless-enabled adapter system 504. As a non-limiting example, the wireless LED bulbs 302, 402 and/or 502 may each comprise an OmniMax™ LED area lighting fixture available from Evluma of Renton, Wash. In each of the examples shown in FIGS. 3-5, a control node (e.g., networked control node, photocontrol) may be coupled to the adapter system (e.g., adapter systems 304, 404 or 504) to provide the functionality discussed herein.

Figure 6:
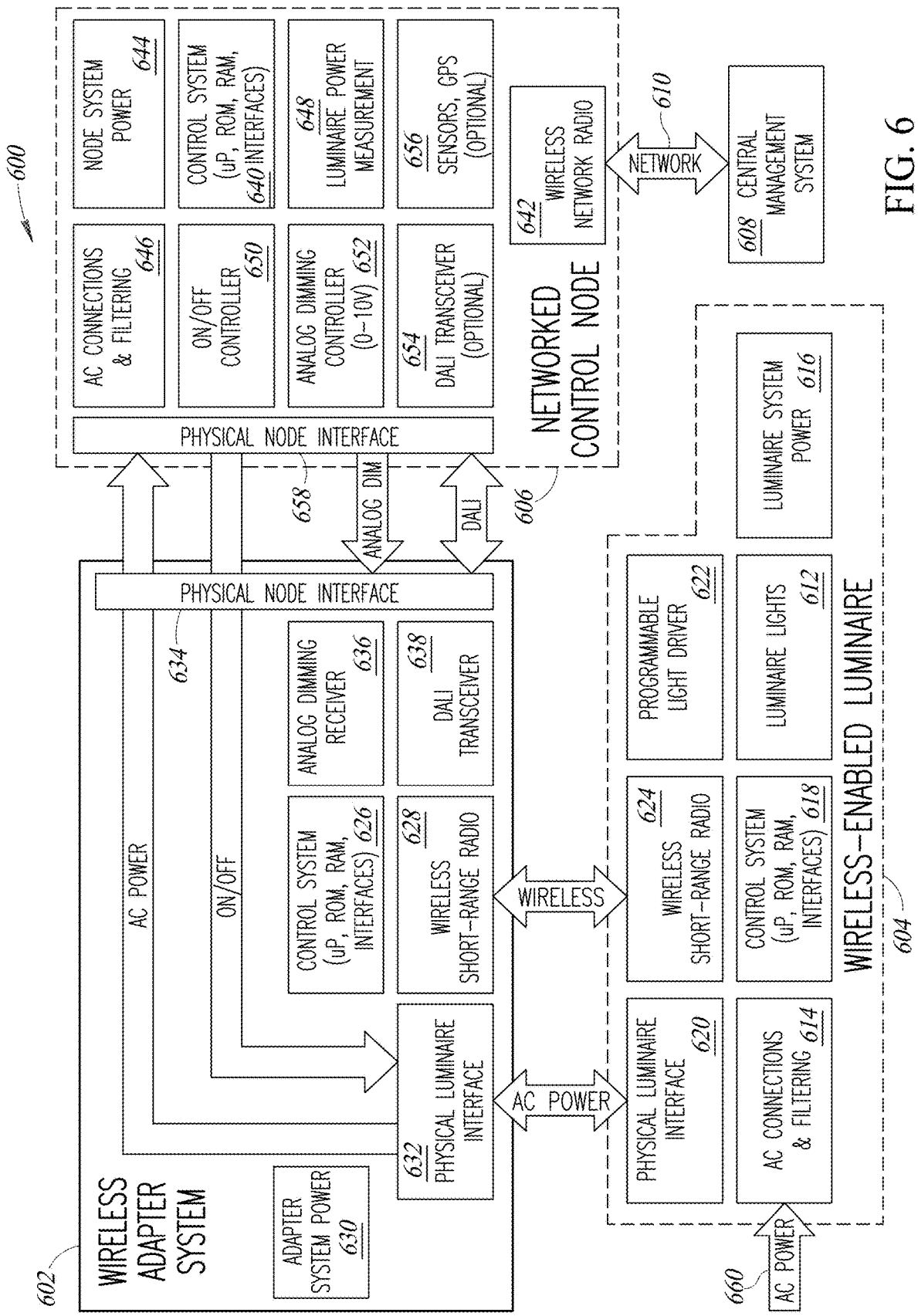
FIG. 6 is a functional block diagram of a wireless adapter system, a wireless-enabled luminaire, and a control node, according to at least one illustrated implementation.

FIG. 6 shows a schematic block diagram of an illumination system 600 that includes a wireless-enabled adapter system (e.g., plug-in embodiment of secondary communications network node or secondary control appliance) 602 coupled to a wireless-enabled luminaire 604 and coupled to a networked control node (e.g., plug-in embodiment of primary network control node or primary network node) 606. The networked control node 606 may communicate via a suitable network 610 (e.g., mobile or cellular network) with a central management system (CMS) 608. FIG. 6 and the following discussion provide a brief, general description of the components forming the illustrative illumination system 600 in which the various illustrated implementations can be practiced. Although not required, some portion of the implementations will be described in the general context of computer-executable instructions or logic and/or data, such as program application modules, objects, or macros being executed by a computer. Those skilled in the relevant art will appreciate that the illustrated implementations as well as other implementations can be practiced with other computer system or processor-based device configurations, including handheld devices, for instance Web enabled cellular phones or PDAs, multiprocessor systems, microprocessor-based or programmable consumer electronics, personal computers ("PCs"), network PCs, minicomputers, mainframe computers, and the like. The implementations can be practiced in distributed computing environments where tasks or modules are performed by remote processing devices, which are linked through a communications network. In a distributed computing environment, program modules may be located in both local and remote memory storage devices.

The luminaire 604 may include one or more light sources 612 (e.g., LEDs), AC connections and filtering circuitry 614, a power supply system 616, a control system 618 (e.g., one or more processors, RAM, ROM, buses, interfaces), a physical luminaire interface 620, a programmable light driver 622, and a wireless short-range radio or transceiver 624 which communicates via a wireless communications protocol (e.g., Bluetooth®).

The wireless adapter system (e.g., "plug-in" embodiment of a secondary communications network node or secondary control appliance) 602 may include a control system 626, a wireless short-range radio or transceiver 628, a power supply system 630, a physical luminaire interface 632, a physical node interface 634, an analog dimming receiver 636, and a DALI transceiver 638.

The networked control node 606 may include a control system 640, a wireless network radio or transceiver 642, a power supply system 644, AC connections and filtering circuitry 646, a luminaire power measurement module 648, an ON/OFF controller 650, an analog dimming controller 652, an optional DALI transceiver 654, optional sensors and/or a GPS receiver 656, and a physical node interface 658.

The AC connections and filtering circuitry 614 of the luminaire 604 may be electrically coupled with a power distribution system 660. The AC connections and filtering circuitry 614 may receive an AC power signal from the power distribution system 660, and the power supply system 616 may generate a DC power output from the AC power input to system components of the luminaire 604. The programmable light driver 622 may supply the generated DC power output to the light sources 612 to power the light sources. The light sources 612 may include one or more of a variety of conventional light sources, for example, incandescent lamps or fluorescent lamps such as high-intensity discharge (HID) lamps (e.g., mercury vapor lamps, high-pressure sodium lamps, metal halide lamps). The light sources may also include one or more solid-state light sources (e.g., light emitting diodes (LEDs), organic LEDs (OLEDs), polymer LEDs (PLEDs)).

The control systems 618, 626 and/or 640 may each include one or more logic processing units, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIG. 6 are of conventional design. As a result, such blocks need not be described in further detail herein, as they will be understood by those skilled in the relevant art. The control systems 618, 626 and/or 640 may utilize a system bus that employs any known bus structures or architectures. The control systems 618, 626 and/or 640 may include system memory that includes read-only memory ("ROM") and/or random access memory ("RAM"). The control systems 618, 626 and/or 640 also may include one or more drives for reading from and writing to one or more nontransitory computer- or processor-readable media (e.g., hard disk, magnetic disk, optical disk). The drive may communicate with one or more processors via a system bus. The drive may include interfaces or controllers coupled between such drives and a system bus, as is known by those skilled in the art. The drives and their associated nontransitory computer- or processor-readable media provide nonvolatile storage of computer-readable instructions, data structures, program modules and other data for the control systems. Those skilled in the relevant art will appreciate that other types of computer-readable media may be employed to store data accessible by a computer.

The physical luminaire interface 632 of the wireless adapter system 602 may be a 3-wire interface (line, neutral, switched line) that connects to the physical luminaire interface 620 (e.g., circuit board) of the luminaire 604. The physical node interface 634 may be a 5-pin or 7-pin receptacle interface (e.g., ANSI C146.41 compliant receptacle) that mates with the physical node interface 658 (e.g., ANSI C146.41 compliant plug) of the networked control node 606.

In operation, the networked control node 606 receives power from the luminaire 604 via the adapter system 602, and sends an ON/OFF signal to the luminaire via the physical luminaire interface 632 (e.g., via the switched line of the 3-wire interface). The wireless adapter system 602 also receives or transmits analog dimming signals and/or DALI signals to and from the networked control node 606 via the physical connection between the physical node interface 634 of the adapter system 602 and the physical node interface 658 of the networked control node 606. The signals received by the analog dimming receiver 636 (or transceiver) or the DALI transceiver 638 may be processed (e.g., translated, interpreted, decoded) into a wireless format that may be sent wirelessly to the luminaire 604. More generally, the wireless adapter system 602 may communicate with the networked control node 606 via the physical node interfaces 634 and 658, and may communicate such information or data with the luminaire 604 via the wireless short-range radios 624 and 628. Thus, the luminaire 604 may utilize the added functionality provided by the networked control node 606.

Advantageously, the wireless adapter systems discussed above may be added to a wireless-enabled luminaire replacing a 3-pin receptacle originally controlled by a basic photocontrol for dusk and dawn transitions. Such allows the photocontrol to be replaced by an enhanced 7-pin lamp control node to provide all of the extended control and status capabilities in the luminaire to be managed by a remote CMS with no other changes to the luminaire. This saves the cost and labor of also replacing an incompatible driver of the luminaire that does not support the enhanced control capabilities of the control node.

Additionally, for decorative post top luminaires (see FIGS. 3-5), the implementations discussed above enable an upgrade from traditional HID bulbs to more energy efficient and long-lasting LED bulb retrofits that are wirelessly enabled. The wireless 7-pin adapter systems can also replace any existing 3-pin receptacle to enable the addition of a networked lamp control node. The resulting combination is significantly less expensive than replacing the entire fixture or replacing all of the electronics with a custom retrofit assembly. Further, if a 3-pin receptacle is housed inside the luminaire housing, an external antenna on the wireless controller may be all that is required. Additionally, if the luminaire has no existing 3-pin receptacle, a wireless 7-pin adapter system may be added on a bracket internally or externally and wired to the appropriate power lines.

In both of the above cases, the luminaire maintains the capability to interface to a smart appliance through the wireless interface. This provides a backup or alternative solution to the wireless network interface should the control node or network fail and the luminaire's settings need to be adjusted.

Figure 7A:
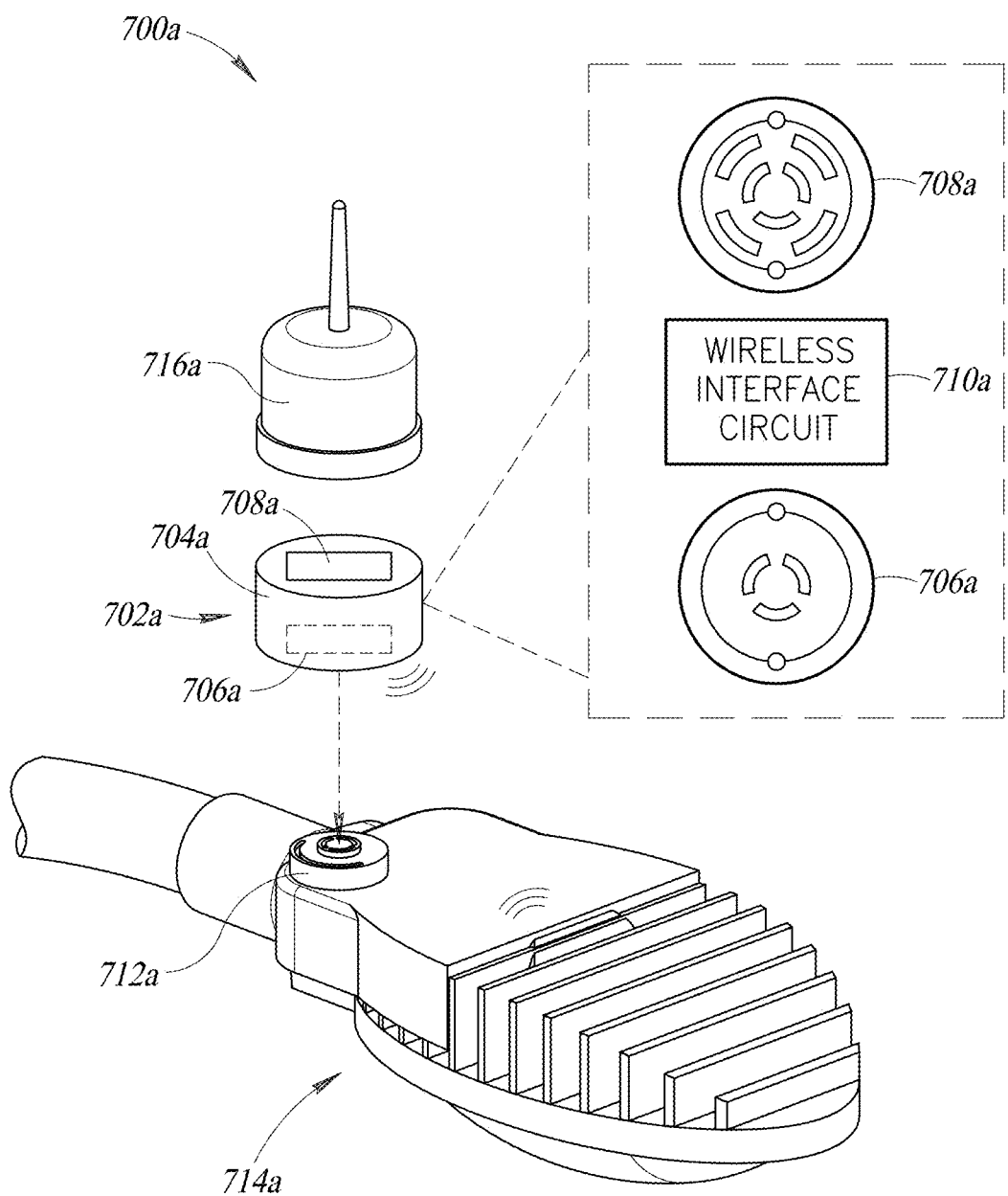
FIG. 7A is a pictorial diagram of an illumination system that includes a wireless adapter that is selectively coupleable to a luminaire and a control node, according to one illustrated implementation.

FIG. 7A shows another implementation of an illumination system 700a that includes a wireless adapter (e.g., plug-in embodiment of secondary communications network node or secondary control appliance) 702a that includes a housing 704a that includes a 3-pin plug 706a on a bottom surface thereof and a 5-pin or 7-pin receptacle 708a on a top surface thereof. The housing 704a of the wireless adapter 702a also includes a wireless interface circuit 710a (e.g., Bluetooth® radio, WiFi® radio) and other components (e.g., control system, power management, dimming receiver, DALI transceiver) as discussed above with reference to the adapter system 602 of FIG. 6. The 3-pin plug 706a plugs into an existing 3-pin receptacle 712a of a wireless-enabled luminaire 714a and converts the luminaire to a 5 or 7-pin receptacle, eliminating the 3-wire interface control limitations on the receptacle 712a of the luminaire. The wireless adapter 702a provides the 7-pin-compatible receptacle 708a for any traditional 3/5/7 pin control node 716a to plug into the luminaire 714a. The wireless adapter 702a may convert 0-10 V dimming commands, and/or DALI commands and status to the equivalent wireless commands that may be transmitted to the luminaire 714a. Power for the integrated control node 716a may also be provided from the luminaire 714a through plug 706a and receptacle 708a the wireless adapter 702a. Advantageously, no physical modification or rewiring of the luminaire 714a or integrated control node 716a is required.

The functional blocks for the wireless adapter 702a may be similar or identical to the wireless adapter system 602 shown in FIG. 6. In this implementation, the physical luminaire interface 632 comprises a standard 3-pin plug (e.g., standard twist lock plug) rather than a 3-wire interface. The 3-pin plug physically connects to the physical luminaire interface 620 of a luminaire, which in this implementation is the standard 3-pin receptacle of the luminaire. In addition to the advantages of the wireless adapter systems discussed above, in this implementation the wireless adapter 702a provides a simple plug-in adapter requiring no additional wiring or connections in the luminaire 714a.

Figure 7B:
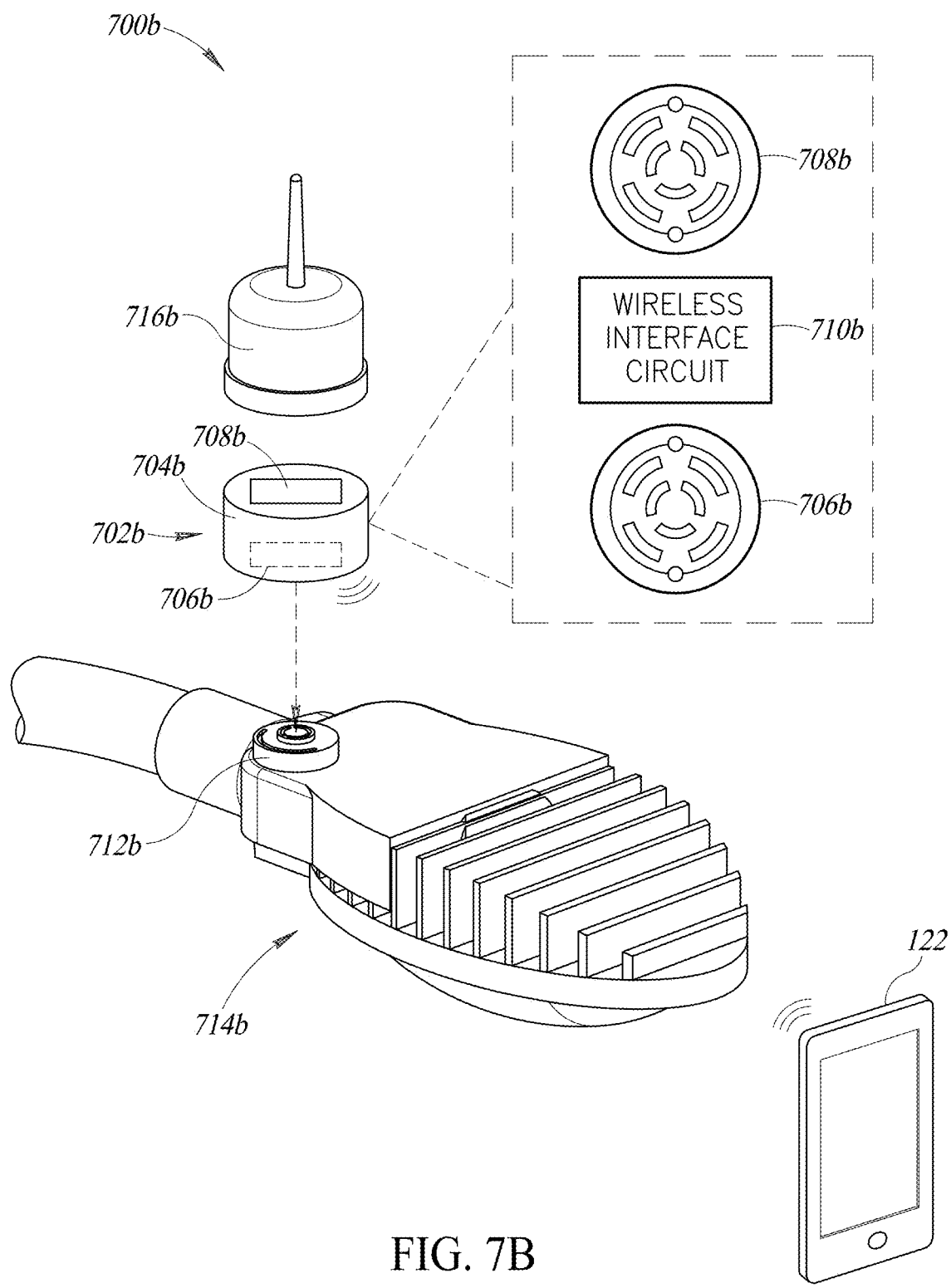
FIG. 7B is a pictorial diagram of an illumination system that includes a wireless adapter that is selectively coupleable to a luminaire and a control node, according to one illustrated implementation.

FIG. 7B shows another implementation of an illumination system 700b that includes a wireless adapter (e.g., plug-in embodiment of secondary communications network node or secondary control appliance) 702b that includes a housing 704b that includes a 5/7-pin plug 706b on a bottom surface thereof and a 5-pin or 7-pin receptacle 708b on a top surface thereof. The housing 704b of the wireless adapter 702b also includes a wireless interface circuit 710b (e.g., Bluetooth® radio, WiFi® radio) and other components (e.g., control system, power management, dimming receiver, DALI transceiver) as discussed above with reference to the adapter system 602 of FIG. 6. The 5/7-pin plug 706b plugs into an existing 5/7-pin receptacle 712b of a luminaire 714b and. The wireless adapter 702b preserves the 7-pin-compatible receptacle 708b for any traditional 3/5/7 pin control node 716b to plug into the luminaire 714b. The wireless adapter 702b may convert 0-10 V dimming commands, and/or DALI commands and status to the equivalent wired commands that may be wiredly passed to the luminaire 714b from the control node. Power for the integrated control node 716b may also be provided from the luminaire 714b through plug 706b and receptacle 708b the wireless adapter 702b. Control of the luminaire can be directly from the plug-in control nodes, and/or from the wireless adapter communicating with the mobile system 122 of FIG. 1, and converted to the wired signal command to the luminaire. Advantageously, no physical modification or rewiring of the luminaire 714b or integrated control node 716b is required while adding the ability to control the luminaire from the mobile system 122. The mobile system 122 (e.g., smartphone, tablet computer) can also communicate with a network of luminaires wirelessly enabled through individual wireless adapters on each otherwise non-wireless luminaire. As previously described, the control note could be physically integrated with the wireless adaptor.

Figure 8:
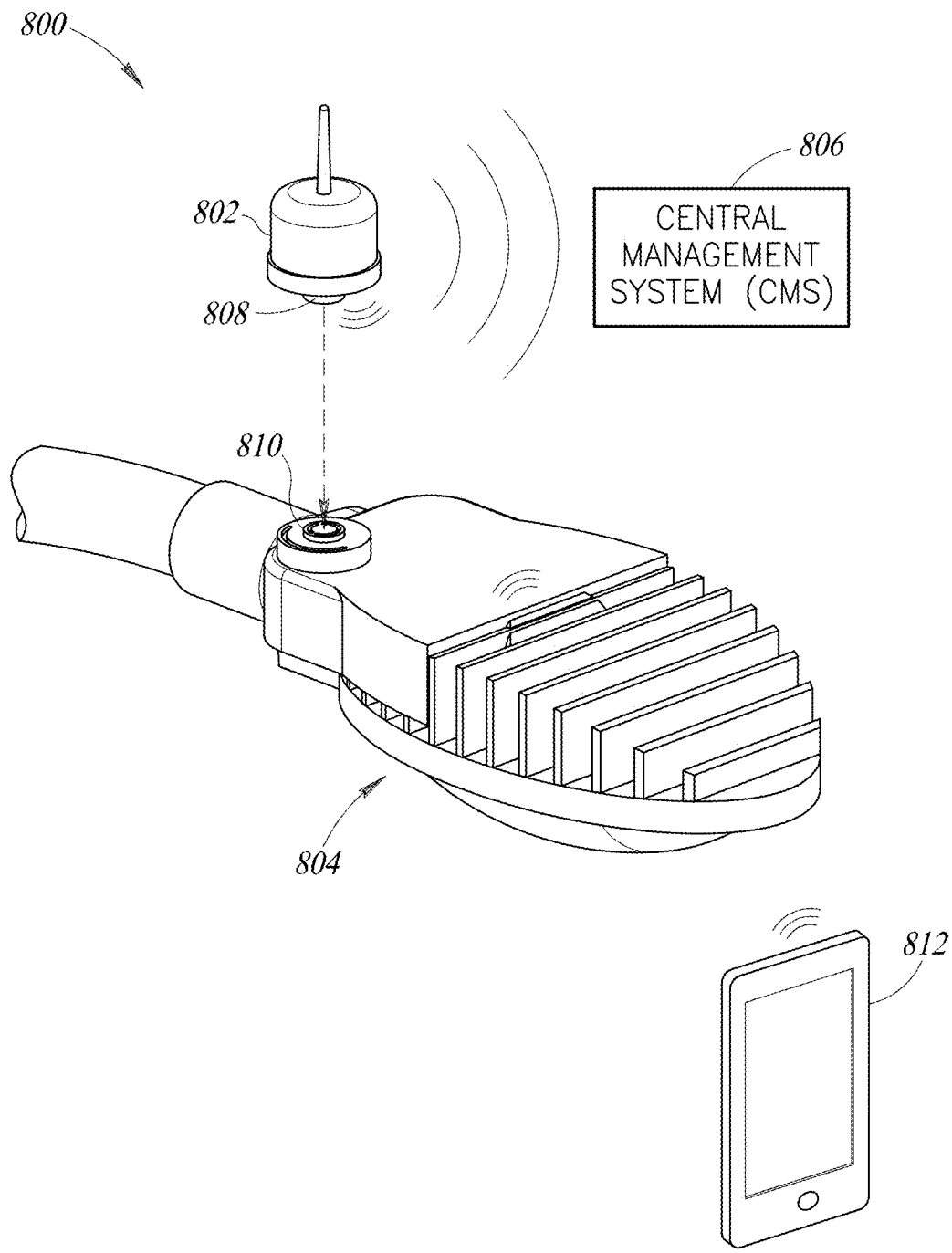
FIG. 8 is a pictorial diagram of an integrated lamp control node, according to one illustrated implementation.

FIG. 8 shows another implementation of an illumination system 800 that includes an integrated control node 802 that contains both a short-range wireless radio (e.g., Bluetooth® radio, WiFi® radio) and a longer range wireless network radio (e.g., cellular network radio) operating together to enable control of a luminaire 804 and other luminaires from a remote central management system (CMS) 806 or other external device. The integrated control node 802 includes a plug 808 that plugs into a 3-pin or 7-pin receptacle 810 on the luminaire 804 for physical mounting of the integrated control node 802 and to also obtain AC power from the luminaire. The control of the luminaire 804 and other luminaires in the vicinity, however, is accomplished via short range wireless signals through a connection between the integrated control node 802 and the wireless-enabled luminaire 804. All commands initiated to the integrated control node 802 via the wireless network radio from the CMS 806 over the wireless network are sent to the luminaire 804 over the short range wireless connection. Similarly, all response information is returned to via the short range wireless interface from the luminaire 804 to the integrated control node 802 and returned to the CMS 806 over the wireless network. The luminaire 806 can still also be controlled by a smart appliance 812, as discussed above, and/or data collected thereby.

Figure 9:
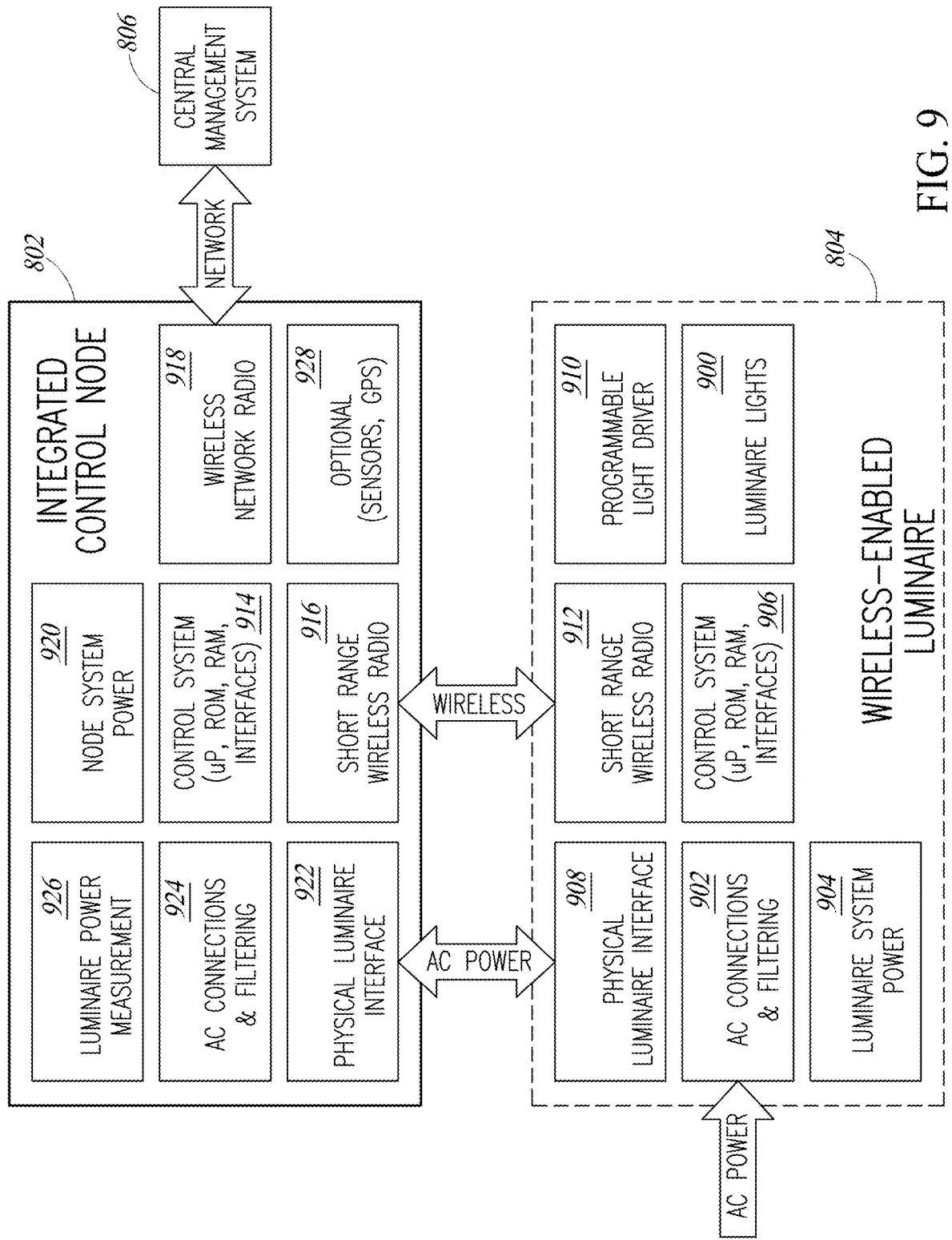
FIG. 9 is a functional block diagram of the integrated lamp control node of FIG. 8, according to one illustrated implementation.

FIG. 9 illustrates the integrated control node 802 and luminaire 804 of FIG. 8 and their interfaces in more detail. The luminaire 804 includes one or more light sources 900 (e.g., LEDs), AC connections and filtering circuitry 902, a power supply system 904, a control system 906 (e.g., one or more processors), a physical luminaire interface 908, a programmable light driver 910, and a wireless short-range radio or transceiver 912 which communicates via a wireless communications protocol (e.g., Bluetooth®). The features of many of these components are discussed above.

The integrated control node 802 includes a control system 914, a short-range wireless radio or transceiver 916 to communicate with one or more luminaires via one communications network and protocol, a wireless network radio or transceiver 918 to communicate with the CMS 806 via another communications network and protocol, a power supply system 920, a physical luminaire interface 922, AC connections and filtering circuitry 924, a luminaire power measurement module 926, and optional sensors and/or a GPS receiver 928. As discussed above with reference to FIG. 8, the physical luminaire interface 922 of the integrated control node 802 may be a standard plug (e.g., 3-pin, 5-pin, 7-pin) and the physical luminaire interface 908 of the luminaire 804 may be a standard receptacle (e.g., 3-pin, 5-pin, 7-pin).

The integrated control node 802 provides several advantages. First, the integrated control node 802 may be added to a wireless luminaire containing only a 3-pin receptacle originally controlled by a basic photocontrol for dusk and dawn transitions. This provides all of the extended control and status capabilities in the luminaires to be managed by a remote CMS without the expense of upgrading the luminaire's physical socket, wiring, and electronics required to support the standard implementation. Second, the integrated control node 802 may be added to a 5-pin socket implementation designed for only remote 0-10 V analog control. This provides all of the control and status capabilities of a full 7-pin (DALI) implementation without added cost in the luminaires. In both of the above cases, the luminaires maintain the capability to interface to a CMS and/or smart appliance via the short range wireless interface (e.g., Bluetooth®). The smart appliance provides a backup or alternative solution to the wireless network interface should the node or network fail and the luminaire's settings need to be adjusted.

One or more implementations of the present disclosure provide systems, methods and articles which utilize luminaires that include wireless communication capabilities that allow a plurality of luminaires to be controlled via a secondary communications network which can be implemented via, for example secondary communications network radio that may be part of a secondary communications node (e.g., wireless adaptor), luminaire control circuitry or a luminaire fixture disposed proximate the other luminaires. One or more implementations discussed herein allow for control of a network (e.g. subnetwork) of wireless-enabled luminaires, for example legacy luminaires where the legacy luminaire fixture was not originally wirelessly-enabled but can or has be retrofitted with, for instance: a wirelessly-enabled light source or a wireless-enabled adapter system (e.g., plug in). Such may advantageously allow communications with a plurality of luminaires without requiring those luminaires to communicate directly with a central management system (CMS). For instance, a secondary communications network node or wireless adaptor may intermediate communications between the CMS and a secondary network comprised of legacy luminaires that were installed without wireless communications capability but later retrofitted with wireless communications capability. This may advantageously eliminate wiring and/or reduce a load on a given communications network. This may also, for example, allow control of historically significant posts and historically significant luminaires by the CMS, and collection of data therefrom, without requiring expensive replacement of the historically significant luminaires which are highly prized in certain historically significant neighborhoods. Information collected from the luminaires via the secondary communications network may be aggregated and uploaded by the secondary communications node (e.g., wireless adaptor) to a central management system (CMS) or data repository. Further, in at least some implementations, the secondary communications nodes (e.g., wireless adaptors) may use their wireless communication ability to obtain data from nearby wireless sensors, which sensor information may be collected via the secondary communications network from one or more luminaires in the secondary network of luminaires. The sensor data and/or other data (e.g., luminaire-related data) may be uploaded to the CMS or data repository in a non-real-time period, for example in aggregated or non-aggregated form.

Figure 10:
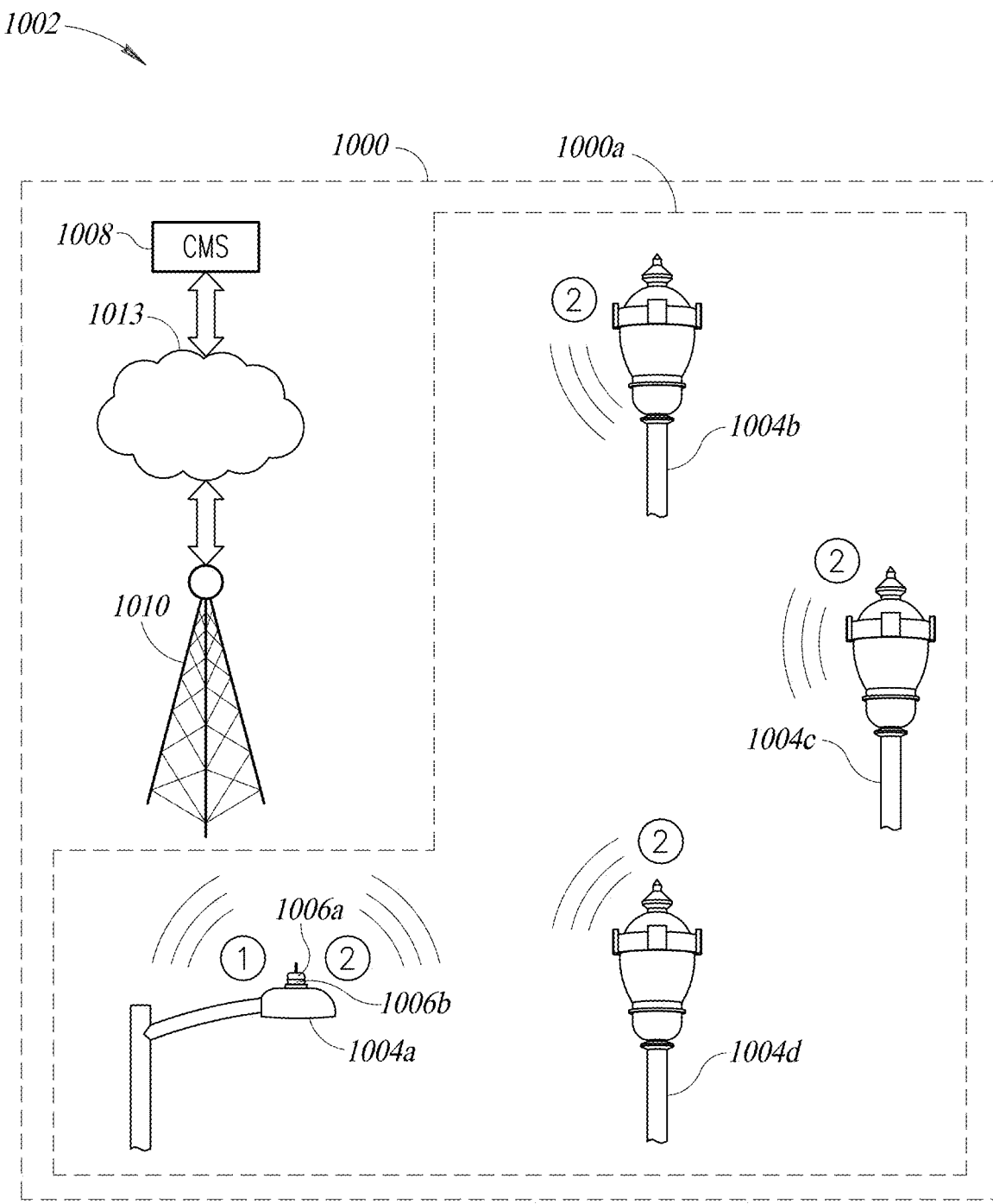
FIG. 10 is a pictorial diagram of an environment in which an illumination system may be implemented, according to at least one illustrated implementation in which communications with a central management system is provided over a primary communications network and communications with a plurality of luminaires is provided over a secondary communications network.

FIG. 10 shows an example operating environment or area 1000 for an illumination system 1002 which includes a plurality wireless-enabled luminaires 1004a, 1004b, 1004c, 1004d (four luminaires shown, collectively luminaires 1004). The environment 1000 may be a highway, park, shopping area, parking garage, city, campus, etc. As discussed further below, each of the luminaires 1004 are communicatively coupled together as a secondary communications network with the ability to be controlled by a one or more secondary communications network nodes disposed proximate (e.g., within 150 meters, within 100 meters, within 50 meters) at least one of the luminaires 1004. Although only the four luminaires 1004a-1004d are shown for explanatory purposes, it should be appreciated than in practice some applications may have more or less than four luminaires (e.g., 2 luminaires, 100 luminaires, 10,000 luminaires).

A primary network node 1006a and a secondary communications network node or secondary control appliance 1006b. The primary network node 1006a and a secondary communications network node or secondary control appliance 1006b are communicatively coupled to one another, for example via a wired interface. As illustrated in FIG. 10, the primary network node 1006a and a secondary communications network node or secondary control appliance 1006b may be mounted or attached to a luminaire 1004a. Alternatively, the primary network node 1006a and a secondary communications network node or secondary control appliance 1006b may be attached to some other structure (e.g., post, pole, support arm, building). In some implementations, the primary network node 1006a and a secondary communications network node or secondary control appliance 1006b may be denominated as gateway and the luminaires 1004a, 1004b, 1004c and 1004d denominated as terminal luminaires.

Each of the luminaires 1004 contains at least one wireless interface (e.g., radio, transceiver) capable of creating a network group or subnetwork within a sub-area 1000a of the geographic area 1000, with the ability for all terminal luminaires 1004a-1004d within the sub-area 1000a to communicate directly or indirectly with the secondary communications network node or secondary control appliance 1006b in a secondary communications network. In at least some implementations, there may be more than one secondary communications network node or secondary control appliance 1006b. The terminal luminaires 1004a-1004d and the secondary communications network node or secondary control appliance 1006b each include a wireless transceiver of a first type ("first type transceiver") that allows the secondary communications network node or secondary control appliance and the luminaires 1004a-1004b to wirelessly communicate with each other via the secondary communications network, for example employing a first communications protocol (e.g., 802.15.4, Zigbee, 6Lowpan, Bluetooth®). Additionally, the secondary communications network node or secondary control appliance 1006b includes a wireless transceiver of a second type ("second type transceiver") that allows for wireless communication with a central management system 1008 via a primary communications network, for example employing a second communications protocol (e.g., cellular protocols, for instance: GSM, IS-95, UMTS, CDMA2000, LTE). The second communications protocol may be different from the first communications protocol.

The secondary communications network node or secondary control appliance 1006b may communicate instructions and/or data with the central management system (CMS) 1008 via the primary communications network 1013. As an example, the secondary communications network node or secondary control appliance 1006b may wirelessly communicate with an access point 1010 (e.g., cellular tower, WIFI® access point) communicatively coupled to the CMS 1008 via one or more suitable data communications networks 1013 (e.g., mobile or cellular telecommunications network(s), Internet). The secondary communications network node or secondary control appliance 1006b may act as a master coordination point for the terminal luminaires 1004a-1004d, mediating communications between the CMS 1008 and the terminal luminaires 1004a-1004d. The CMS 1008 may be similar, or even identical to the CMS 124 (FIG. 1).

Figure 11:
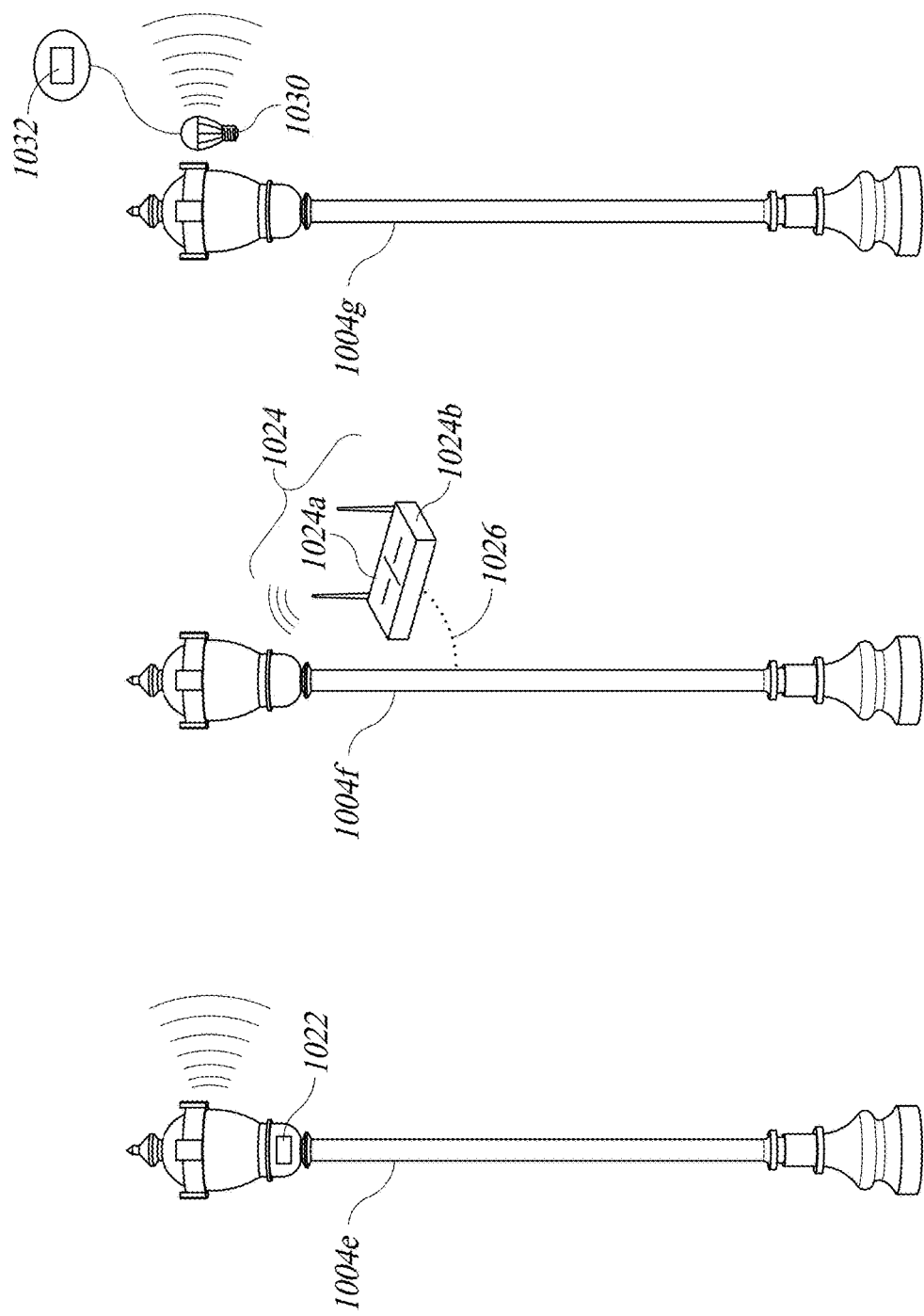
FIG. 11 is a pictorial diagram of a number of luminaires of the illumination system of FIG. 10, according to at least one illustrated implementation.

FIG. 11 shows various non-limiting examples of how a wireless interface may be implemented for the luminaires of the present disclosure. In particular, FIG. 11 shows luminaires 1004e, 1004f and 1004g. The luminaires 1004e-1004g may be similar or identical to the luminaires 1004a-1004d of FIG. 10. In the illustrated example, the luminaire 1004e contains a wireless network interface 1022 integrated therein (e.g., wireless-enabled light source, wireless-enabled adapter), for example as part of the luminaire 1004e when the luminaire 1004e was originally installed or deployed in the field. The luminaire 1004f may implement a short-range wireless communications protocol (e.g., Bluetooth®) which communicates with a secondary communications network node 1024 physically connected to or located nearby the luminaire 1004f by a suitable connection 1026. For example, the luminaire 1004f may comprise an AreaMax™ LED area lighting fixture available from Evluma of Renton, Wash. In such implementations, the secondary communications network node 1024 may provide the luminaire 1004f with access to the secondary communications network or subnetwork. The secondary communications network node 1024 may be physically coupled to a pole 1028 of the luminaire 1004f by the connection 1026 which comprises one or more fasteners (e.g., brackets, bolts, nuts, screws). Alternatively, the secondary communications network node 1024 may be positioned in or on a building or other structure, within a wireless range of the luminaire 1004f. As another example, the luminaire 1004g may include a retrofit lamp 1030 which includes a wireless transceiver 1032 integrated therein. For example, the retrofit lamp 1030 may comprise an Omni-Max™ LED area lighting fixture available from Evluma of Renton, Wash.

Referring back to FIG. 10, the secondary communications network node or secondary control appliance 1006, 1024b communicates with the terminal luminaires 1004a-1004d via a suitable secondary wireless network (e.g., 802.15.4, Zigbee, 6Lowpan, Bluetooth®). In at least some implementations, the secondary communications network node or secondary control appliance 1006b, 1024 is operative to control the luminaires 1004a-1004d for at least one of commissioning, decommissioning, setting dimming levels and schedules, setting operational parameters, providing firmware updates, etc. The luminaires 1004 may be configured to operate as a group, as multiple groups with different parameters, or individually. The luminaires 1004 may each retain their respective settings, which may be saved in nonvolatile memory associated with each of the luminaires. In at least some implementations, the secondary communications network node or secondary control appliance 1006b, 1024 may also retrieve information from each of the luminaires 1004, including information such as programmable settings, manufacturing information (e.g., model number, serial number, network ID), any operational or maintenance information or logs retained in the luminaire, etc. In at least some implementations, the secondary communications network node or secondary control appliance 1006b may broadcast messages to two, more or all luminaires 1004 within a range. In at least some implementations the secondary communications network node or secondary control appliance 1006b may unicast or multi-cast messages to one or more luminaires 1004 within a range, for example by addressing the messages. The range may be defined as a range from the secondary communications network node or secondary control appliance 1006b, or a range defined by a daisy chained set if luminaires 1004.

Figure 12:
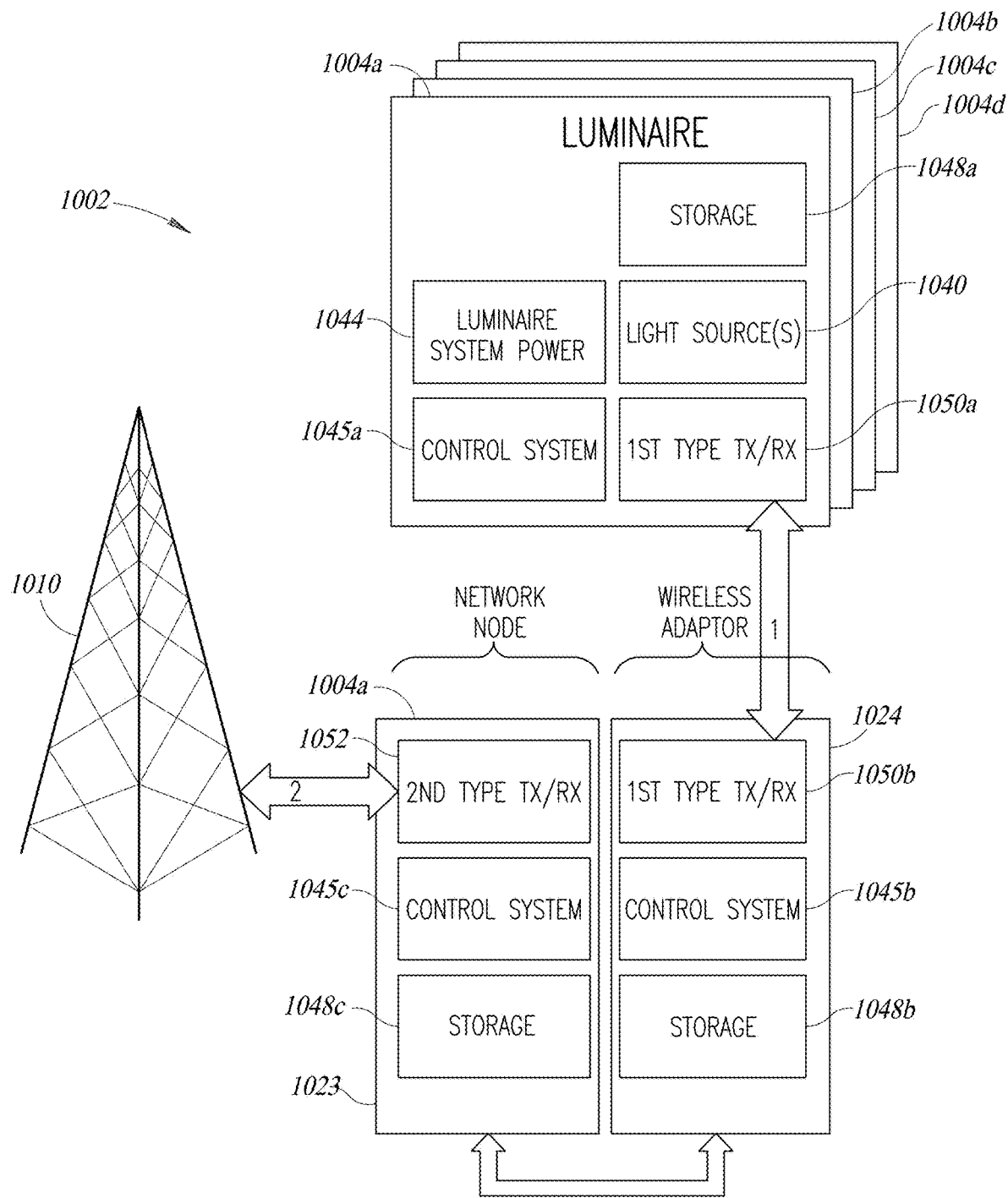
FIG. 12 is a functional block diagram of a gateway luminaire, a terminal luminaire, and a mobile system of the illumination system of FIG. 10, according to at least one illustrated implementation.
Figure 13:
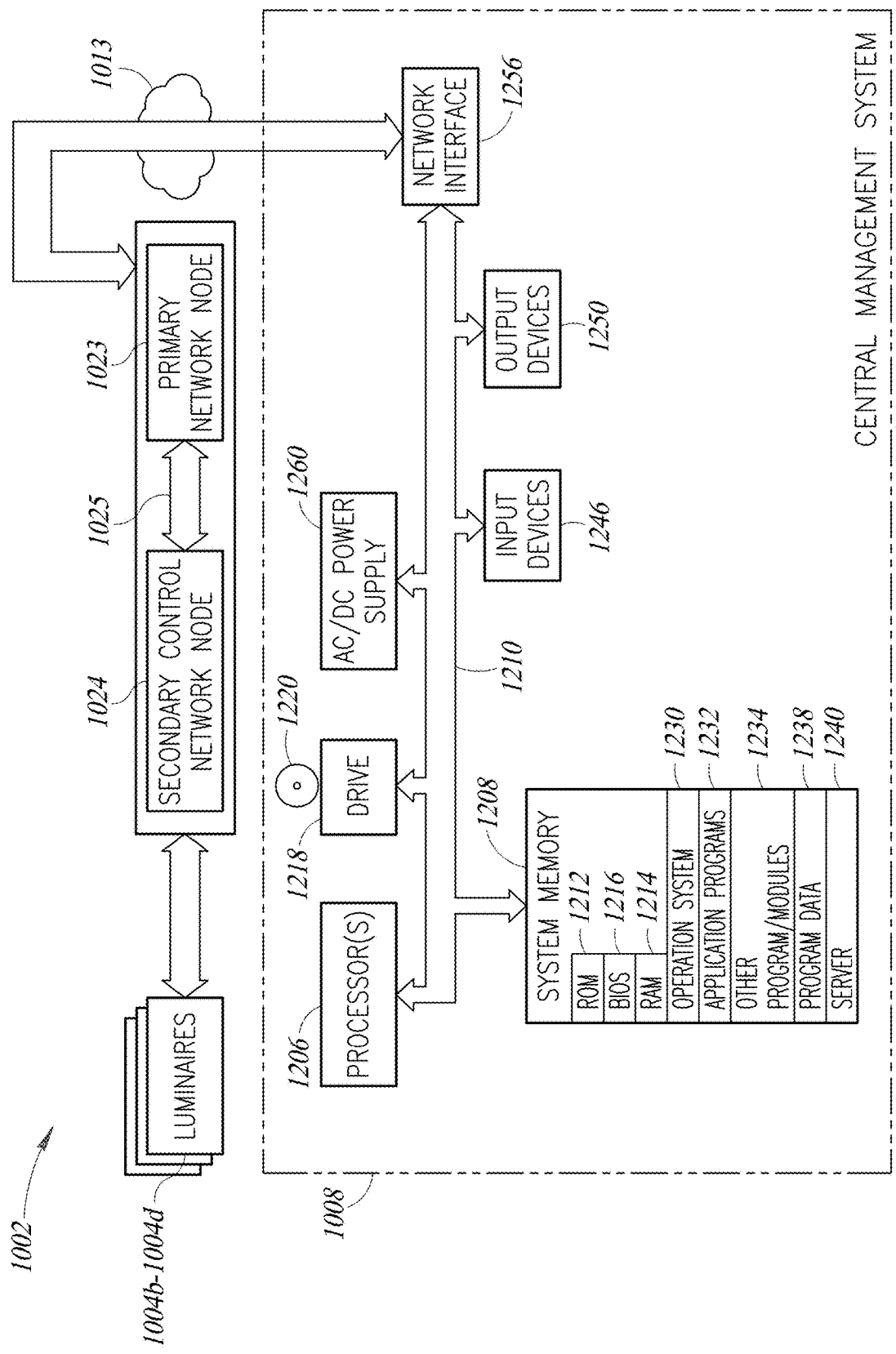
FIG. 13 is a functional block diagram of a central management system, a gateway luminaire, a terminal luminaire and a mobile system of the illumination system of FIG. 10, according to at least one illustrated implementation.
Figure 17:
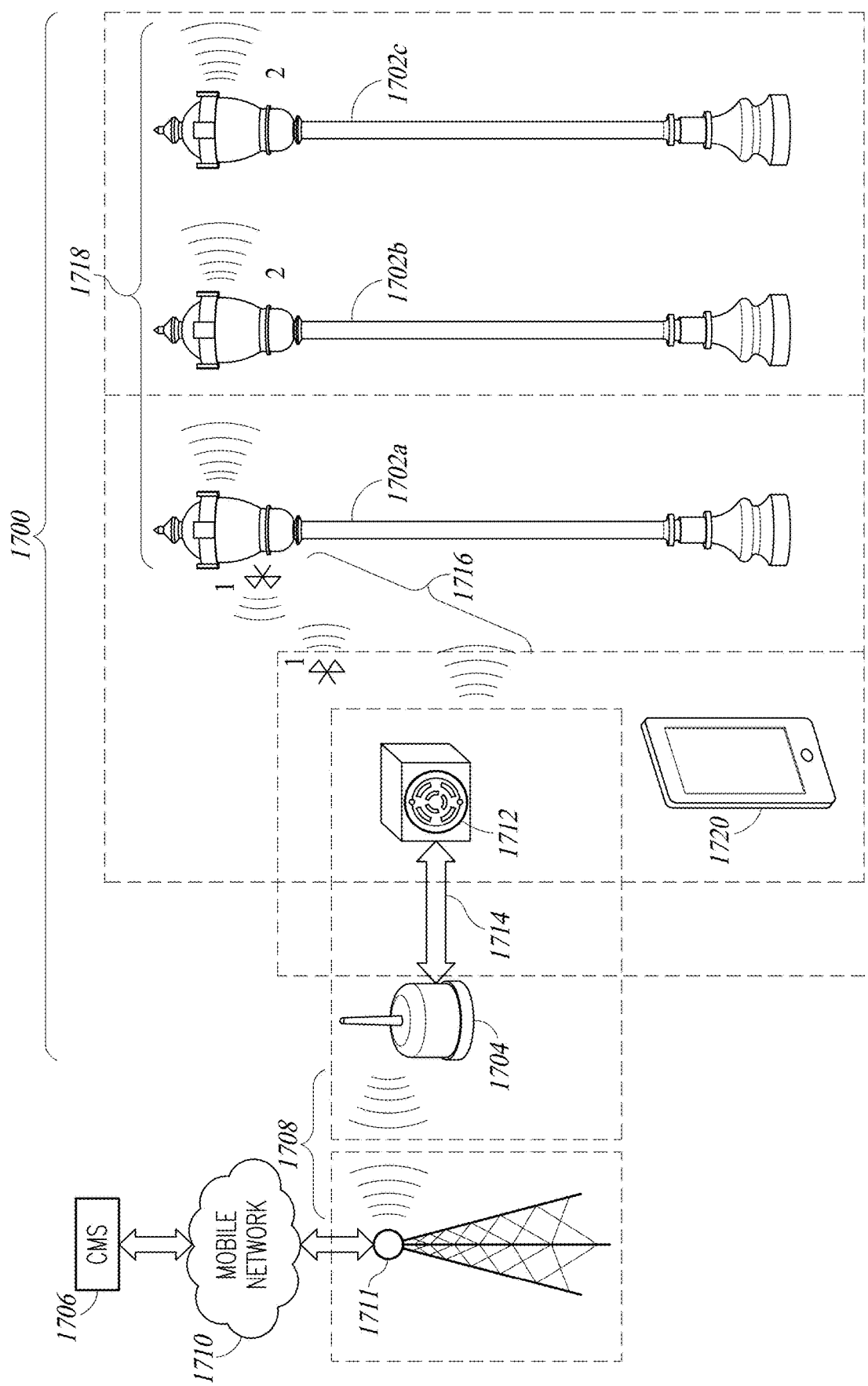
FIG. 17 a pictorial diagram of a luminaire system comprising a plurality of luminaires, a primary network node, and a secondary control appliance (e.g., wireless adaptor) the primary network node and the secondary control appliance communicatively coupled to one another and which communicatively couples the luminaires to a luminaire management system via a mobile or cellular network, a secondary communications network, and optionally a tertiary communications network, according to at least one implementation.

FIGS. 12 and 13 and the following discussion provide a brief, general description of the components forming the illustrative illumination system 1002 including the central management system 1008, the primary network node 1006a, 1023, secondary communications network node 1006b, 1024, and interface 1025, and the terminal luminaires 1004a-1004d in which the various illustrated implementations can be practiced. The primary network node 1006a, 1023, secondary communications network node 1006b, 1024, and/or interface 1025 may be implemented as part of, or attached to one of the luminaires 1004a as illustrated in FIG. 10 or 11, or may be implemented as a standalone device as illustrated in FIG. 17. The secondary communications network node 1024 may advantageously collect information (e.g., operational stage, power draw) from a plurality of luminaires that form a group or subnet, and provide an aggregation of the information to the CMS. For example, the secondary communications network node 1024 may provide the aggregate in the form of a total power consumption by all of the luminaires in the group or subnet, or an indication of an error if an single one of the luminaires of the group or subnet is exhibiting an error condition or anomaly. Thus, the group of luminaires may appear to the CMS as a single luminaire, simplifying networking and control.

Although not required, some portion of the implementations will be described in the general context of computer-executable instructions or logic and/or data, such as program application modules, objects, or macros being executed by a computer. Those skilled in the relevant art will appreciate that the illustrated implementations as well as other implementations can be practiced with other computer system or processor-based device configurations, including handheld devices, for instance Web enabled cellular phones or PDAs, multiprocessor systems, microprocessor-based or programmable consumer electronics, personal computers ("PCs"), network PCs, minicomputers, mainframe computers, and the like. The implementations can be practiced in distributed computing environments where tasks or modules are performed by remote processing devices, which are linked through a communications network. In a distributed computing environment, program modules may be located in both local and remote memory storage devices.

The central management system 1008 may take the form of a PC, server, or other computing system executing logic or other machine executable instructions. The central management system 1008 includes one or more processors 1206, a system memory 1208 and a system bus 1210 that couples various system components including the system memory 1208 to the processor 1206. The central management system 1008 will at times be referred to in the singular herein, but this is not intended to limit the implementations to a single system, since in certain implementations, there will be more than one central management system 1008 or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The central management system 1008 may be implemented as a SCADA system or as one or more components thereof. Generally, a SCADA system is a system operating with coded signals over communication channels to provide control of remote equipment. The supervisory system may be combined with a data acquisition system by adding the use of coded signals over communication channels to acquire information about the status of the remote equipment for display or for recording functions.

The processor 1206 may be any logic processing unit, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIGS. 12 and 13 should be recognizable by one of ordinary skill in the art. As a result, such blocks need not be described in further detail herein, as they will be understood by those skilled in the relevant art.

The system bus 1210 can employ any known bus structures or architectures. The system memory 1208 includes read-only memory ("ROM") 1212 and random access memory ("RAM") 1214. A basic input/output system ("BIOS") 1216, which may be incorporated into at least a portion of the ROM 1212, contains basic routines that help transfer information between elements within the central management system 1008, such as during start-up. Some implementations may employ separate buses for data, instructions and power.

The central management system 1008 also may include one or more drives 1218 for reading from and writing to one or more nontransitory computer- or processor-readable media 1220 (e.g., hard disk, magnetic disk, optical disk). The drive 1218 may communicate with the processor 1206 via the system bus 1210. The drive 1218 may include interfaces or controllers (not shown) coupled between such drives and the system bus 1210, as is known by those skilled in the art. The drives 1218 and their associated nontransitory computer- or processor-readable media 1220 provide nonvolatile storage of computer-readable instructions, data structures, program modules and other data for the central management system 1008. Those skilled in the relevant art will appreciate that other types of computer-readable media may be employed to store data accessible by a computer.

Program modules can be stored in the system memory 1208, such as an operating system 1230, one or more application programs 1232, other programs or modules 1234, and program data 1238.

The application program(s) 1232 may include logic capable of providing the luminaire management functionality described herein. For example, applications programs 1232 may include programs to analyze and organize luminaire information automatically received from the luminaires 1004. The application programs 1232 may also include programs to present raw or analyzed illumination information in a format suitable for presentation to a user.

The system memory 1208 may include communications programs 1240 that permit the central management system 1008 to access and exchange data with other networked systems or components, such as the luminaires 1004, the mobile systems 1006, and/or other computing devices.

While shown in FIG. 13 as being stored in the system memory 1208, the operating system 1230, application programs 1232, other programs/modules 1234, program data 1238 and communications 1240 can be stored on the nontransitory computer- or processor-readable media 1220 or other nontransitory computer- or processor-readable media.

Personnel can enter commands (e.g., system maintenance, upgrades) and information (e.g., parameters) into the central management system 1008 using one or more communicably coupled input devices 1246 such as a touch screen or keyboard, a pointing device such as a mouse, and/or a push button. Other input devices can include a microphone, joystick, game pad, tablet, scanner, biometric scanning device, etc. These and other input devices may be connected to the processing unit 1206 through an interface such as a universal serial bus ("USB") interface that couples to the system bus 1210, although other interfaces such as a parallel port, a game port or a wireless interface or a serial port may be used. One or more output devices 1250, such as a monitor or other display device, may be coupled to the system bus 1210 via a video interface, such as a video adapter. In at least some instances, the input devices 1246 and the output devices 1250 may be located proximate the central management system 1008, for example when the system is installed at the system user's premises. In other instances, the input devices 1246 and the output devices 1250 may be located remote from the central management system 1008, for example when the system is installed on the premises of a service provider. In some implementations, the central management system 1008 uses one or more of the logical connections to communicate with one or more mobile systems, remote computers, servers and/or other devices via one or more communications channels, for example, the one or more networks 1013. These logical connections may facilitate any known method of permitting computers to communicate, such as through one or more LANs and/or WANs. Such networking environments are known in wired and wireless enterprise-wide computer networks, intranets, extranets, and the Internet.

In some implementations, a network port or interface 1256, communicatively linked to the system bus 1210, may be used for establishing and maintaining communications over the primary communications network 1013.

The central management system 1008 may include an AC/DC power supply 1260. The AC/DC power supply 1260 converts AC power from a power source (e.g., AC mains) into DC power, which may be provided to power the various components of the central management system 1008.

In the illumination system 1002, program modules, application programs, or data, or portions thereof, can be stored in one or more computing systems. Those skilled in the relevant art will recognize that the network connections shown in FIG. 13 are only some examples of ways of establishing communications between computers, and other connections may be used, including wireless. In some implementations, program modules, application programs, or data, or portions thereof, can even be stored in other computer systems or other devices (not shown).

For convenience, the processor 1206, system memory 1208, network port 1256 and devices 1246, 1250 are illustrated as communicatively coupled to each other via one or more buses 1210, thereby providing connectivity between the above-described components. In alternative implementations, the above-described components may be communicatively coupled in a different manner than illustrated in FIG. 13. For example, one or more of the above-described components may be directly coupled to other components, or may be coupled to each other, via intermediary components (not shown). In some implementations, the one or more buses 1210 are omitted and the components are coupled directly to each other using suitable connections.

It should be appreciated that the luminaires 1004 may include components similar to those components present in the central management system 1008, including the processor 1206, power supply 1260, buses, nontransitory computer- or processor-readable media, wired or wireless communications interfaces, and one or more input and/or output devices.

The secondary communications network node 1024 can include any device, system or combination of systems and devices having at least wireless communications capabilities and the ability to operate between a primary communications network and a secondary communications network. In most instances, the secondary communications network node 1024 includes additional devices, systems, or combinations of systems and devices capable of providing graphical data display capabilities. In at least some implementations, the secondary communications network node 1024 includes one, more or all of the electrical or electronics structures of the control node 606 and the wireless adapter system 602 (FIG. 6), which may be integrated to a single device or housing. In other implementations, the secondary communications network node 1024 may additionally include one or more of the physical and/or communications interfaces, with the electrical or electronics structures of the control node 606 and the wireless adapter system 602 (FIG. 6) split between separate structures or housings.

As shown in FIG. 12, each of the luminaires 1004 includes one or more light sources 1040, a power supply 1044, a local illumination control system (ICS) 1045*a* (e.g., one or more processors), a nontransitory data store 1048*a* (e.g., memory, RAM, ROM, FLASH, disk based storage), and an instance of a first type transceiver 1050*a* which communicates via a first wireless communications protocol (e.g., Bluetooth®, Wi-Fi®) as part of the secondary communications network 1.

In at least some implementations, the luminaires 1004 include a satellite positioning receiver such as GPS receiver, Glonass, etc., and store their position data in nontransitory computer- or processor-readable media or memory. The position data may only need to be acquired relatively infrequently, thus enabling location data to be acquired in poor reception areas or with relatively low cost receiver hardware.

The secondary communications network node 1024 includes a control system 1045b (e.g., one or more processors) and a nontransitory data store 1048b (e.g., memory, RAM, ROM, FLASH, disk based storage) communicatively coupled to the control system 1045b and which stores at least one of processor-executable instructions and/or data. The nontransitory data store 1048b also stores information or data collected from or about the luminaries 1004a-1004d, either in raw form or amalgamated form. The control system 1045b may convert raw form data to amalgamated form. The secondary communications network node 1024 includes an instance of a first type transceiver 1050b which communicates via the first wireless communications protocol (e.g., Bluetooth®, Wi-Fi®) as part of the secondary communications network 1. The first type of transceiver 1050b allow for communication with the luminaires 1004 that form the secondary communications network 1.

The primary network node 1023 includes a control system 1045c (e.g., one or more processors) and a nontransitory data store 1048c (e.g., memory, RAM, ROM, FLASH, disk based storage) communicatively coupled to the control system 1045c and which stores at least one of processor-executable instructions and/or data. The primary network node 1023 includes an instance of a second type transceiver 1052 which communicates via the second wireless communications protocol (e.g., cellular or mobile protocols, for instance GSM, CDMA) as part of the primary communications network 2. The second type transceiver 1052 provides wireless communications capabilities which allow communications with the CMS 1008 for example via a cellular or mobile communications provider network.

During installation, testing or setup of the luminaires 1004, the secondary communications network node 1024 may transmit information (e.g., geographical coordinates, configuration information or instructions, operational information or instructions) to the luminaires 1004a-1004d over a secondary data communications channel (e.g., Bluetooth®, Wi-Fi®). The secondary communications network node 1024 may additionally or alternatively receive information pertaining to one or more luminaires 1004a-1004d, one or more sensors, etc. The secondary communications network node 1024 may amalgamate information collected from across a plurality of luminaires 1004a-1004d. The primary communications network node 1023 may receive information (e.g., geographical coordinates, configuration information or instructions, operational information or instructions) from the central management system 1008 over a primary data communications channel (e.g., cellular, mobile). The primary communications network node 1023 may additionally or alternatively transmit information pertaining to one or more luminaires 1004a-1004d (e.g., amalgamated information) to the central management system 1008 via primary data communications channel (e.g., cellular, mobile). Communications between the primary and secondary network nodes 1023, 1024 may occur via a physical interface or even a hardwired physical interface.

In at least some implementations, each of the luminaires 1004 is programmed with a unique identifier (e.g., identification number, such as a serial number). The unique identifier uniquely identifies the respective luminaire with respect to all other luminaires in an installation, or installed base, asset collection, or inventory of an entity. The unique identifier may be programmed or otherwise stored in the nontransitory data store 1018 during manufacture, during installation, or at any other time. The unique identifier may be programmed using the secondary network nodes 1024, a factory programming fixture, DIP switches, or using any other suitable method.

Once the luminaires 1004 have received their respective identification information and any other configuration information, the luminaires 1004 may send such information to the CMS 1008 via the primary network node 1023 and secondary communications network node 1024, for storage by the CMS 1008. As discussed in further detail below, the CMS 1008 may utilize the received luminaire information to build an asset management table. The CMS 1008 may also include mapping functions that generate an asset management map which may visually present luminaire information to one or more users. The CMS 1008 may also analyze the collected data and generate one or more electronic reports that are valuable for users associated with the illumination system 1002.

The local ICS 1045a of each of the luminaires 1004 may include a photocontrol, or an interface to a photocontrol, that has a photosensitive transducer (photosensor) associated therewith. The ICS 1045a may be operative to control operation of the light sources 1040 based on ambient light levels detected by the photosensor. The ICS 1045a may provide illumination data signals to control the light sources 1040. The ICS 1045a may also include a switch that provides electrical power to the light sources 1040 only when detected light levels are below a desired level. For example, the local ICS 1045a of each of the luminaires 1004 may include a photosensor that controls an electro-mechanical relay coupled between a source of electrical power and a control device (e.g., a magnetic or electronic transformer) within the luminaires. The electro-mechanical relay may be configured to be in an electrically continuous state unless a signal from the photosensor is present to supply power to the luminaires 1004. If the photosensor is illuminated with a sufficient amount of light, the photosensor outputs the signal that causes the electro-mechanical relay to switch to an electrically discontinuous state such that no power is supplied to the luminaires 1004.

In some implementations, the ICS 1045a may include one or more clocks or timers, and/or one or more look-up tables or other data structures that indicate dawn events and dusk events for one or more geographical locations at various times during a year. The time of occurrence of various solar events may additionally or alternatively be calculated using geolocation, time, or date data either generated by or stored within a nontransitory processor-readable medium of the luminaires 1004 or obtained from one or more external devices via one or more wired or wireless communication interfaces either in or communicably coupled to the luminaire. In some implementations, the ICS 1045a is implemented partially or fully by one or more processors.

The power supply 1044 of the luminaires 1004 may be electrically coupled with a power distribution system. The power supply 1044 may receive an AC power signal from the power distribution system, generate a DC power output, and supply the generated DC power output to the light sources 1040 to power the light sources as controlled by light source control commands from the ICS 1045a.

The light sources 1040 may include one or more of a variety of conventional light sources, for example, incandescent lamps or fluorescent lamps such as high-intensity discharge (HID) lamps (e.g., mercury vapor lamps, high-pressure sodium lamps, metal halide lamps). The light sources 140 may also include one or more solid-state light sources (e.g., light emitting diodes (LEDs), organic LEDs (OLEDs), polymer LEDs (PLEDs)).

The secondary network node 1024 may receive luminaire information from each of the luminaires 1004 in the illumination system 1002. For example, in some implementations the secondary network node 1024 may interrogate the luminaires 1004 and receive signals from each of the luminaires that provide luminaire information. The secondary network node 1024 may send such information (e.g., amalgamated information) to the CMS 1008, as discussed above, via the primary network node 1023 and primary communications network. Similarly, the secondary network node 1024 may send information (e.g., control information, operational parameter information) to the luminaires 1004 via the secondary communications network. Such information may be received by the CMS 1008 via one or more primary communications networks (e.g., primary communications network 1013).

The CMS 1008 may store the luminaire information in one or more nontransitory computer- or processor-readable media (e.g., nontransitory computer- or processor-readable media 1220 of FIG. 13). The luminaire information may include, for example, identification information, location information, installation date, installation cost, installation details, type of luminaire, maintenance activities, specifications, purchase date, cost, expected lifetime, warranty information, service contracts, service history, spare parts, comments, or anything other information that may be useful to users (e.g., management, analysts, purchasers, installers, maintenance workers).

Logged data from each of the networked luminaires 1004 can be retrieved and passed to the CMS 1008 or other data repository via the gateway 1006 via the primary communications network. This information may contain any available information from the luminaires, including operational and maintenance data, performance data such as power usage, and asset management data such as luminaire model, serial number, and location (if available).

Advantageously, the illumination system 1002 shown in FIGS. 10-13 can be implemented without requiring the luminaires 1004 to be on the same communications network as the CMS 1008 or to use the same communication protocol as the CMS 1008. For small deployments of outdoor luminaires (e.g., smaller cities and towns), the cost and complexity of implementing a complete real-time control center may be prohibitive and may provide little day-to-day value. In at least some implementations of the present disclosure, the primary network node 1023 and/or secondary network node 1024 may be positioned in the field, and legacy luminaires retrofitted with wireless-enabled lights, allowing simple and inexpensive control and data reporting with respect to the legacy luminaires. Further, the primary network node 1023 and/or secondary network node 1024 may be deployed to allow control of the entire subnetwork of luminaires 1004.

Further, in at least some of the implementations of the present disclosure network security is increased significantly over traditional luminaire network deployments. Since the network of luminaires 1004 may not be connected directly to the Internet, no attacks can be generated on the infrastructure through Web-based cyber-attacks. An attacker would need to physically access the wireless secondary network with the ability to intercept wireless communications to affect the network of luminaires 1004 in the illumination system 1002. Further, network security is increased since the illumination system 1002 may be connected to the Internet only during brief intervals when the secondary network node 1024 is connected to the Internet when communicating with the CMS 1008 over a primary communications network (e.g., cellular or mobile network).

The data distribution and collection by the secondary network node 1024 allows periodic information to be manually initiated by a data collection user and added to a repository without the need for having a complete end-to-end real-time control and monitoring center in place. The data can be refreshed periodically and can be made available on-demand.

Figure 14:
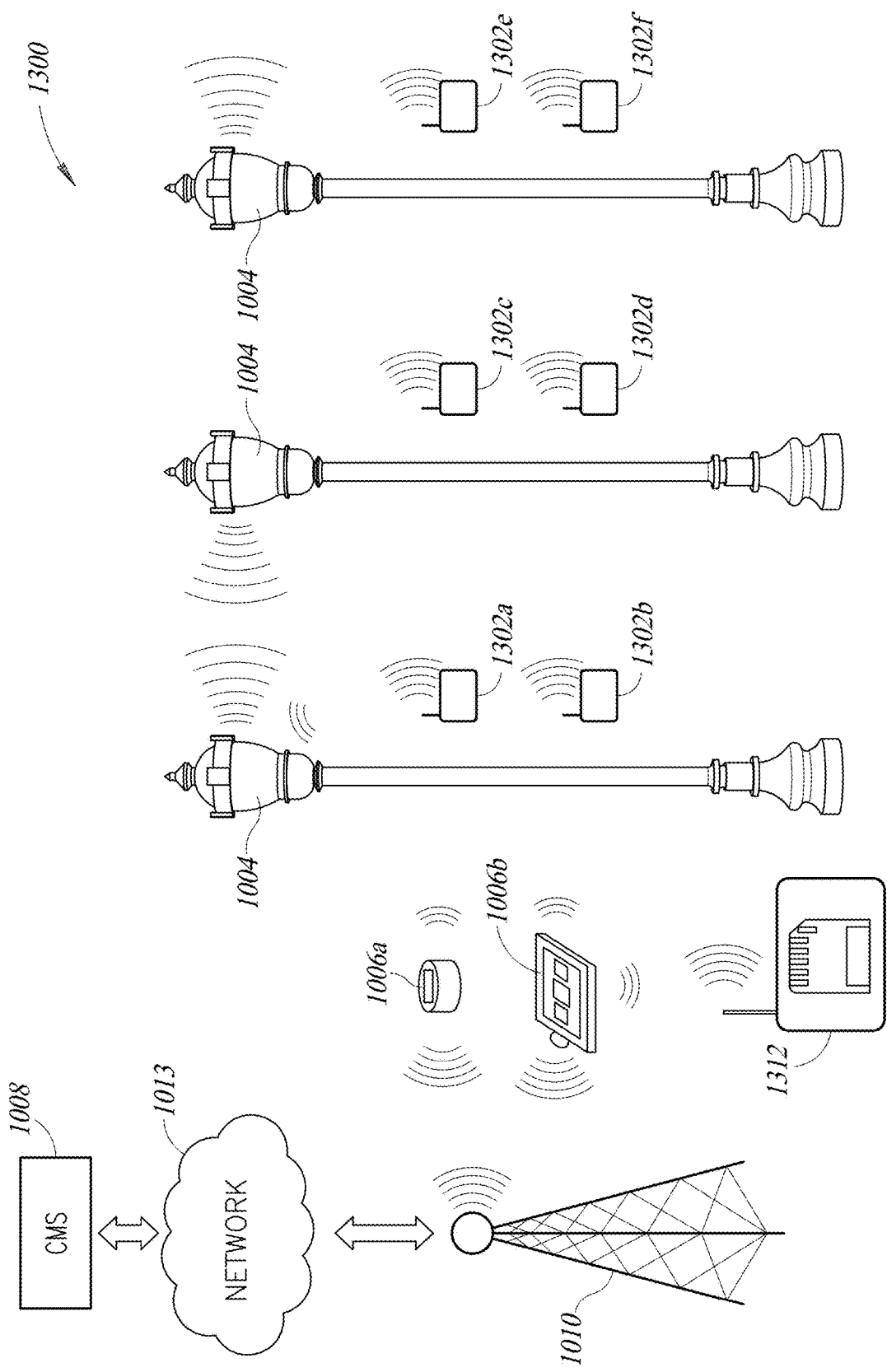
FIG. 14 is a pictorial diagram of an illumination system that gathers data from a plurality of wireless sensors, according to one illustrated implementation.
Figure 15:
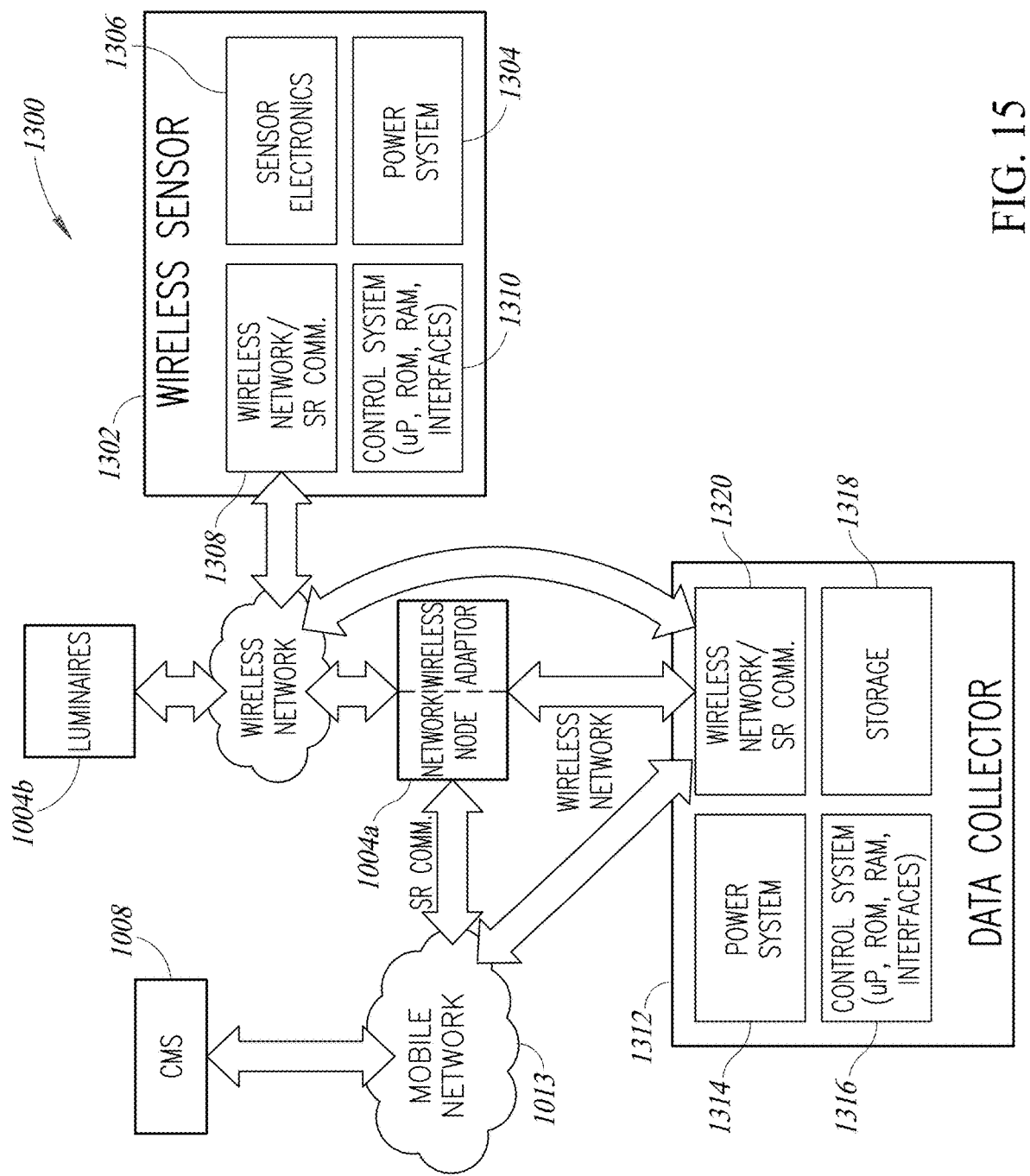
FIG. 15 is a functional block diagram of the illumination system of FIG. 14, according to one illustrated implementation.

FIGS. 14 and 15 illustrate another implementation of an illumination system 1300. The illumination system 1300 is similar or identical to the illumination system 1002 in many respects, so the discussion below concentrates only on the differences between the two systems for the sake of brevity.

The illumination system 1300 provides a data collection network which includes a plurality of luminaires 1004. One or more of the luminaires 1004 may obtain periodic sensor data from one or more sensors 1302*a*-1302*f* (collectively, sensors 1302) and may temporarily store the data locally in the luminaire 1004, and may deliver the sensor data over a short-range wireless communications protocol via a secondary communications network to a secondary communications network node 1006*b* or a set of luminaire control circuitry 1006*b*, which in turn may deliver the data to the central management system 1008 over a suitable primary communications network (e.g., cellular or mobile network) 1013 via primary communications network node 1006*a*. As an example, each of the one or more sensors 1302*a*-1302*f* may gather sensor data (e.g., continuously, periodically, from time-to-time) and may send the sensor data to one of the luminaires 1004 for temporary storage in a memory of the luminaire. In some implementations, the one or more of the secondary communications network node 1006*b* may obtain sensor data from the one or more sensors 1302 and temporarily store the data locally in memory, which data may be sent by the one or more secondary network nodes 1006*b*, 1024 to be collected, amalgamated, and delivered thereby to the central management system 1008 via the primary network node 1006*a*, 1023, as discussed above.

In operation, the secondary network nodes 1006*b*, 1024 may network via the secondary communications network with the communication-enabled sensors 1302 that collect information from areas proximate the illumination system 1300 and from time-to-time send data to the primary network nodes 1006*a*, 1023, which may from time-to-time send the data to the CMS 1008 or other data repository in offline or online mode. Non-limiting examples of sensors may include a motion sensor (e.g., traffic sensor, a pedestrian sensor, a parking space usage sensor), a temperature sensor, a humidity sensor, a carbon monoxide sensor, a noise sensor, a gunshot detection sensor, etc.

Each of the luminaires 1004 contains wireless network communication capability, either single wireless network capability or dual wireless network and short-range network (e.g., Bluetooth®) capability, as discussed above. Each of the sensors 1302 includes a power system 1304, sensor electronics 1306, a control system 1310, and at least one transceiver 1308 (e.g., wireless network and/or short-range communications protocol, such as Bluetooth®). The sensors 1302 may be battery-powered or may receive power from power lines of a luminaire pole to which the sensor is coupled, or via a photovoltaic array. The sensors 1302 can be any sensors that detect events or periodically record any type of measurement.

In at least some implementations, a wireless data collector 1312 (e.g., network attached storage) may be positioned proximate at least one of the luminaires 1004 and may be coupled to the secondary communications network (formed by: luminaires 1004 and the secondary communications network node 1006b, 1024). The data collector 1312 may include a power system 1314, a control system 1316, data storage 1318, and one or more wireless transceivers 1320. In operation, the data collector 1312 wirelessly receives and stores a large dataset from multiple sensors 1302 for a period of time. The data collector 1312 can be positioned anywhere in coverage of the wireless network where it has access to receiving data from any of the sensors 1302 directly or via one or more of the luminaires 1004. The data collector 1312 may be a separate component or may be integrated into a secondary network nodes 1006b, 1024 (e.g., data storage amalgamated across multiple luminaires).

Upon a trigger to capture data, the sensors 1302 may transfer the data to the data collector 1312 or the secondary network node 1006b, 1024 via the secondary wireless network or a tertiary wireless network. The secondary network node 1006b, 1024 may periodically access the sensor data stored by the data collector 1312 and transfer the set of data to the CMS 1008 or other remote repository via the primary network node 1006a, 1023. In at least some implementations, the data collector 1312 may also be enabled for short-range wireless communication (e.g., Bluetooth®), which allows for direct connection between the data collector 1312 and the secondary network node 1006b, 1024.

The illumination system 1300 of FIGS. 14 and 15 advantageously leverages the luminaire control and data collection network to add additional data collection capabilities from sensors, and does not require a fully deployed centralized management system for collection of the sensor information. Further, as with the illumination system 1002 discussed above, for the illumination system 1300 network security is increased over traditional luminaire network deployments since the luminaire network is optionally connected to the Internet only via the secondary network nodes 1006b, 1024. The illumination system 1300 network also reduces the number of nodes that would otherwise need to be supported via a more direct connection with the CMS 1008.

Various of the described components or devices may include a control system or processor and associated non-transitory computer- or processor-readable media or memory, for instance one or more data stores that may take the form of nonvolatile memories such as read only memory (ROM) or FLASH memory and/or one or more volatile memories such as random access memory (RAM).

While the primary network nodes 1006a, 1023 and secondary network nodes 1006b, 1024 are generally described as including two transceivers or radios and associated antennas for implementing the primary communication network and the secondary communications network, in at least some implementations, the primary network nodes 1006a, 1023 and secondary network nodes 1006b, 1024 may include one or more additional transceivers or radios, for example to provide communications with one or more mobile communications devices (e.g., tablet computers, cellular or mobile phones). The primary network nodes 1006a, 1023 and secondary network nodes 1006b, 1024 may further be communicatively coupled via one or more wired interfaces (not shown) that utilize parallel cables, serial cables, or wireless channels capable of high speed communications, for instance, via one or more of FireWire®, Universal Serial Bus® (USB), Thunderbolt®, or Gigabit Ethernet®, for example.

Some or all of the components within the primary network nodes 1006a, 1023 and secondary network nodes 1006b, 1024 may be communicably coupled using at least one bus (not shown) or similar structure adapted to transferring, transporting, or conveying data between the devices, systems, or components used within the primary network nodes 1006a, 1023 and secondary network nodes 1006b, 1024. The bus can include one or more serial communications links or a parallel communications link such as an 8-bit, 16-bit, 32-bit, or 64-bit data bus. In some implementations, a redundant bus (not shown) may be present to provide failover capability in the event of a failure or disruption of a primary bus.

The control system or processor(s) 1045 (FIG. 12) may include any type of processor (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the processor(s) 1045a-1045c, a non-volatile memory may store all or a portion of a basic input/output system (BIOS), boot sequence, firmware, startup routine, and communications device operating system (e.g., iOS®, Android®, Windows® Phone, Windows® 8, and similar) executed by the processor 1282 upon initial application of power. The processor(s) 1045a-1045c may also execute one or more sets of logic or one or more machine executable instruction sets loaded from volatile memory subsequent to the initial application of power to the processor 1045a-1045c. The processor 1045a-1045c may also include a system clock, a calendar, or similar time measurement devices. One or more geolocation devices, for example a Global Positioning System (GPS) receiver may be communicably coupled to the processor 1045a-1045c to provide additional functionality such as geolocation data to the processor 1045a-1045c.

The transceivers or radios described herein can include any device capable of transmitting and receiving communications via electromagnetic energy. Non-limiting examples of cellular communications transceivers or radios include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the cellular transceivers or radios can include more than one interface. For example, in some instances, the cellular transceivers or radios can include at least one dedicated, full- or half-duplex, voice call interface and at least one dedicated data interface. In other instances, the cellular transceivers or radios can include at least one integrated interface capable of contemporaneously accommodating both full- or half-duplex voice calls and data transfer.

Non-limiting examples of W-Fi® short-range transceivers or radios include various chipsets available from Broadcom, including BCM43142, BCM4313, BCM94312MC, BCM4312, and chipsets available from Atmel, Marvell, or Redpine. Non-limiting examples of Bluetooth® short-range transceivers or radios include various chipsets available from Nordic Semiconductor, Texas Instruments, Cambridge Silicon Radio, Broadcom, and EM Microelectronic.

As noted, nontransitory computer- or processor-readable media can, for example, include non-volatile storage memory and in some implementations may include volatile memory as well. At least a portion of the nontransitory computer- or processor-readable media may be used to store one or more processor executable instruction sets for execution by the processor 1045a-1045c. In some implementations, all or a portion of the memory may be disposed within the processor 1045a-1045c, for example in the form of a cache. In some implementations, the memory may be supplemented with one or more slots configured to accept the insertion of one or more removable memory devices such as a secure digital (SD) card, a compact flash (CF) card, a universal serial bus (USB) memory "stick," or the like.

In at least some implementations, one or more sets of logic or machine executable instructions providing luminaire control applications or "apps" executable by the processor 1045a-1045c may be stored in whole or in part in at least a portion of the memory. In at least some instances, the applications may be downloaded or otherwise acquired by the end user. In some implementations, such applications may start up in response to selection of a corresponding user selectable icon by the user. The applications can facilitate establishing a data link between the primary network nodes 1006a, 1023 and secondary network nodes 1006b, 1024 and the central management system 1008 or the luminaires 1004 via the transceivers or radios and communication networks.

Figure 16:
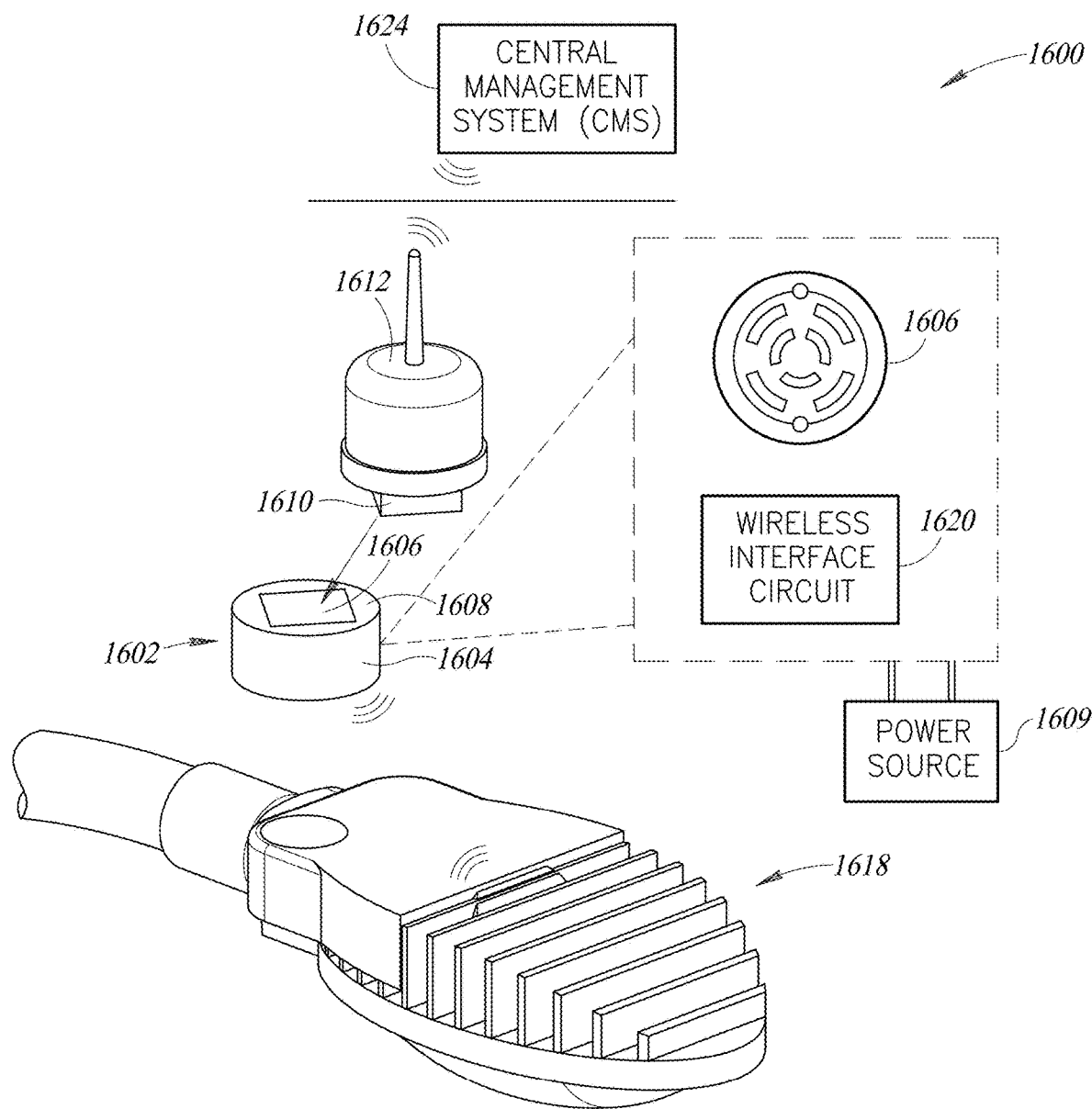
FIG. 16 a pictorial diagram of an illumination system which includes a secondary communications network node, a primary network control node coupled to the secondary communications network node, and a luminaire, according to at least one implementation.

FIG. 16 shows an illumination system 1600 which includes a secondary communications network node 1602, a primary network control node 1612, and a luminaire 1618. The secondary communications network node 1602 includes a housing 1604 that includes a receptacle interface 1606 on a top surface 1608 thereof. As a non-limiting example, the receptacle interface 1606 may be a 5-pin or a 7-pin receptacle interface (e.g., ANSI C146.41) that receives a 5-pin or 7-pin plug 110 of the primary networked control node 1612 or 3-pin plug 114 of a standard photocontrol (not shown in FIG. 16). The luminaire 1618 may comprise an AreaMax™ LED area lighting fixture available from Evluma of Renton, Wash., for example. Alternatively, the luminaire may contain or include a wirelessly-enabled light source or blub or drive circuit. A power source 1609 may supply power to the secondary communications network node 1602. The power source 1609 may be part of the secondary communications network node 1602, for example one or more chemical batteries, ultra-capacitors, and/or photovoltaic arrays. Additionally or alternatively, the power source 1609 may an external source of power, for example AC power from the luminaire 1618 or from grid or mains power lines. The secondary communications network node 1602 may provide AC power to the primary network control node 1612) which is coupled to the receptacle interface 1606 of the secondary communications network node 1602.

The secondary communications network node 1602 also includes a short-range wireless interface circuit 1620 (e.g., Bluetooth®, WiFi) disposed in the housing 1604. In operation, the secondary communications network node 1602 receives via the wired receptacle interface 1606 ON/OFF, dimming, or other commands or data from the control node 112 and autonomously interprets or translates those signals using one or more processors, for example. The received interpreted signals are translated into wireless signals that are transmitted by the wireless interface circuit 1620 of the secondary communications network node 1602 and transmitted to the wireless-enabled luminaire 1618. Optionally, the secondary communications network node 1602 may receive via the wireless interface circuit 1620 signals encoding data or instructions from the luminaire 1618, and may interpret and transmit the signals to the primary network control node 1612 via the wired receptacle interface 1606. The instructions or commands may be in the form of switch-controlled ON/OFF signals, analog dimming with dim-to-off capability (e.g., 0-10 V), digital control and status commands (e.g., DALI), or any other types of signals.

As noted above, the luminaire 1618 may contain one or more short-range wireless network interfaces (e.g., Bluetooth®, WiFi) that allow the luminaire to communicate with the secondary communications network node 1602 disposed proximate (e.g., within 150 meters, within 100 meters, within 50 meters) the luminaire 1618. Although only one luminaire is shown for explanatory purposes, it should be appreciated than in practice some applications may have a plurality of luminaires (e.g., 2 luminaires, 100 luminaires, 1000 luminaires).

The primary network control node 1612 may communicate instructions and/or data with a central management system (CMS) 1624 via a primary communications network (e.g., an access point for instance cellular tower, WIFI® access point) communicatively coupled to the CMS via one or more suitable data communications networks (e.g., mobile telecommunications network(s), Internet).

FIG. 17 shows a luminaire system 1700 which includes a plurality of luminaires 1702a, 1702b, 1702c (only three shown, collectively 1702). Each of the luminaires 1702 may be a wireless-enabled luminaire (e.g., Evluma AreaMax) or may include a wireless-enabled light source (e.g., Evluma OmniMax, not shown in FIG. 17), also referred to interchangeably herein as wireless luminaires or wireless light sources. The wireless-enabled luminaire or wireless-enabled light source may each include a respective radio (e.g., transmitter, receiver, transceiver) and associated antenna (not shown in FIG. 17).

The luminaire system 1700 optionally includes a primary network node 1704. The primary network node 1704 comprises a first primary network node radio (not shown in FIG. 17) operable to provide a primary communication network 1708 to provide wireless communications with a remotely located luminaire management system (CMS) 1706 via a cellular or mobile communications network 1710, for instance including a base station 1711. Primary communications network 1708 employs a primary or first communications protocol, e.g., GSM protocol or other cellular protocol.

The luminaire system 1700 includes a secondary control appliance 1712. The secondary control appliance 1712 includes a primary network node interface 1714, a secondary communications network radio (not shown in FIG. 17), and at least one processor (not shown in FIG. 17). The primary network node interface 1714 comprises a communications interface to communicatively couple the secondary control appliance 1712 with the primary network node 1704. The primary network node interface 1714 may take the form of a 5-pin receptacle interface, a 7-pin receptacle interface that mates with a physical node interface of the primary network control node, or a hardwired interface (e.g., wires physically attached together). The secondary communications network radio is operable to provide a secondary communications network 1716 to provide wireless communications with at least one of the luminaires 1702. The secondary communications network 1716 may operate according to a second communications protocol (e.g., Bluetooth), where the second communications protocol may be different from the first communications protocol. The secondary communications network 1716 may be distinct from the primary communications network 1708.

The secondary control appliance 1712 can be separate and distinct from the luminaires 1702. The secondary control appliance 1712 can be mounted directly to a structure (e.g., pole, post, arm, head) of an existing luminaire 1702. The secondary control appliance 1712 can be mounted on a luminaire, for instance via a standard interface socket. For instance, secondary control appliance 1712 can be mounted to a modern street light (e.g., street light with wirelessly-enabled luminaire) which is nearby or proximate (e.g., within wireless range) a group of legacy street lights that have been out retrofitted with wirelessly-enabled light sources. The secondary control appliance 1712 can be mounted on a building or other structure that is which is nearby or proximate (e.g., within wireless range) a group of legacy street lights that have been out retrofitted with wirelessly-enabled light sources. The secondary control appliance 1712 can be powered from AC power available from an existing luminaire, either through a hardwired connection or via a pass-through adapter on a standard interface socket.

In at least some implementations, each of the plurality of luminaires comprises a respective tertiary radio and antenna (not shown in FIG. 17) operable to provide a tertiary communications network 1718 for communications between pair or more of the luminaires. The tertiary communications network 1718 may operate according to a tertiary communications protocol (e.g., WI-FI), where the tertiary communications protocol may be different from the first communications protocol and/or different from the secondary communications protocol. The tertiary communications network 1718 may be distinct from the primary communications network 1708 and/or the secondary communications network 1716.

In operation, the secondary control appliance 1712 can aggregate status from all of the luminaires 1702 in a group. The secondary control appliance 1712 can provide the primary network node 1704 with a single operational status for the group of luminaires. The operational status can include an indication that at least one luminaire 1702 is not operating as expected or that all luminaires 1702 in the group are operating as expected. The operational status can additionally or alternatively include an indication of a total power draw of the luminaires 1702 in the group, for example summed from each individual luminaire 1702 on the tertiary communications network 1718. The secondary control appliance 1712 can additionally translate commands and/or data between the primary network node 1704 and the luminaires 1702, providing bi-directional communications between the luminaire management system (CMS) 1706 and the luminaires 1702 of a group of luminaires.

The primary network node 1704 can communicate with the secondary control appliance 1721 via analog methods for dimming, on/off enable, and power status, in addition to digital control and status methods, such as DALI (digitally addressable lighting interface). The secondary control appliance 1721 and subnetwork luminaires 1702 as a group may look like a single luminaire on the primary network 1708 for control and status or allow access to individual luminaires 1702 on the secondary or tertiary wireless network 1716, 1718.

The approach described herein may advantageously significantly reduced the number of primary lighting network nodes required in areas where there are many luminaires in close proximity, while still enabling control and status to be communicated from the luminaire management system (CMS) 1706. The approach described herein may advantageously enhance the ability to cost-effectively add to a lighting network, decorative and historic luminaires to that do not contain the necessary lighting network node interfaces. The approach described herein may advantageously enhance the ability to scale far beyond the power-handling and control limitations of networked contactor solutions currently available.

In at least some implementations, a smart appliance 1720 (e.g., wirelessly-enabled mobile device, smartphone, tablet computer, laptop computer) may wirelessly communicate with the secondary control appliance 1712. Such communications may, for example, be via the secondary communications network 1716 or via a separate channel or network (e.g., Bluetooth) from the secondary communications network 1716.

The smart appliance 1720 can wirelessly communicate with the secondary control appliance 1712 to allow configuring and/or provisioning the of the luminaires 1702 in the group, and to allow locally controlling the luminaires 1702 in the group in parallel with control by the CMS 1706 via the primary network node 1704. This enables overrides or local control in the event of a network failure to the CMS 1706 or failure of the mobile or cellular network 1710. The smart appliance 1720 can also download information from the secondary control appliance 1712, which characterizes or represents the operational status of the luminaires 1702 of the group of luminaires.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; U.S. Patent Publication No. 2016/0021713, published Jan. 21, 2016; PCT Publication No. WO2010/057115, published May 20, 2010; U.S. Provisional Patent Application No. 61/174,913, filed May 1, 2009; U.S. Pat. No. 8,926,139, issued Jan. 6, 2015; PCT Publication No. WO2010/127138, published Nov. 4, 2010; U.S. Provisional Patent Application No. 61/180,017, filed May 20, 2009; U.S. Pat. No. 8,872,964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Pat. No. 9,241,401, granted Jan. 19, 2016; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Pat. No. 9,312,451, issued Apr. 12, 2016; PCT Publication No. WO2013/040333, published Mar. 21, 2013; U.S. Provisional Patent Application No. 61/567,308, filed Dec. 6, 2011; U.S. Pat. No. 9,360,198, issued Jun. 7, 2016; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; U.S. Patent Publication No. 2016/0037605, published Feb. 4, 2016; PCT Publication No. WO2014/018773, published Jan. 30, 2014; U.S. Provisional Patent Application No. 61/723,675, filed Nov. 7, 2012; U.S. Pat. No. 9,301,365, issued Mar. 29, 2016; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; U.S. Pat. No. 9,433,062, issued Aug. 30, 2016; PCT Publication No. WO2014/078854, published May 22, 2014; U.S. Provisional Patent Application No. 61/764,395, filed Feb. 13, 2013; U.S. Pat. No. 9,288,873, issued Mar. 15, 2016; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Pat. No. 9,185,777, issued Nov. 10, 2015; PCT Publication No. WO2015/116812, published Aug. 6, 2015; U.S. Provisional Patent Application No. 61/905,699, filed Nov. 18, 2013; U.S. Pat. No. 9,414,449, issued Aug. 9, 2016; U.S. Provisional Patent Application No. 62/068,517, filed Oct. 24, 2014; U.S. Provisional Patent Application No. 62/183,505, filed Jun. 23, 2015; U.S. Pat. No. 9,445,485, issued Sep. 13, 2016; PCT Publication No. WO2016/064542, published Apr. 28, 2016; U.S. Provisional Patent Application No. 62/082,463, filed Nov. 20, 2014; U.S. Publication No. 2016/0150369, published May 26, 2016; PCT Publication No. WO2016/081071, published May 26, 2016; U.S. Provisional Patent Application No. 62/057,419, filed Sep. 30, 2014; U.S. Publication No. 2016/0095186, published Mar. 31, 2016; PCT Publication No. WO2016/054085, published Apr. 7, 2016; U.S. Provisional Patent Application No. 62/114,826, filed Feb. 11, 2015; U.S. Non-provisional patent application Ser. No. 14/939,856, filed Nov. 12, 2015; U.S. Provisional Patent Application No. 62/137,666, filed Mar. 24, 2015; U.S. Non-provisional patent application Ser. No. 14/994,569, filed Jan. 13, 2016; U.S. Non-provisional patent application Ser. No. 14/844,944, filed Sep. 3, 2015; U.S. Provisional Patent Application No. 62/208,403, filed Aug. 21, 2015; U.S. Non-provisional patent application Ser. No. 15/238,129, filed Aug. 16, 2016; U.S. Provisional Patent Application No. 62/264,694, filed Dec. 8, 2015; U.S. Non-provisional patent application Ser. No. 15/369,559, filed Dec. 5, 2016; U.S. Provisional Patent Application No. 62/397,709, filed Sep. 21, 2016; U.S. Provisional Patent Application No. 62/397,713, filed Sep. 21, 2016; U.S. Provisional Patent Application No. 62/327,939, filed Apr. 26, 2016; U.S. Provisional Patent Application No. 62/379,037, filed Aug. 24, 2016; U.S. Provisional Patent Application No. 62/458,970, filed Feb. 14, 2017; U.S. patent application Ser. No. 15/895,439, filed Feb. 13, 2018 (now U.S. Pat. No. 10,098,212); U.S. Provisional Patent Application No. 62/480,833, filed Apr. 3, 2017; U.S. patent application Ser. No. 16/284,869, filed Apr. 2, 2018; and U.S. patent application Ser. No. 15/943,183, filed Apr. 2, 2018, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A secondary communications network node to operate luminaires in conjunction with a primary network control node, the primary network control node which includes a first primary network control node radio that provides wireless communications with a remotely located central management system via a primary communications network, the secondary communications network node comprising:
   a housing;
   a secondary communications network radio housed by the housing, the secondary communications network radio which provides wireless communications with at least one of: a number of wireless light sources or a number of wireless luminaires via a secondary communications network, the secondary communications network distinct from the primary communications network;
   at least one processor housed by the housing, the at least one processor communicatively coupled to the secondary communications network radio; and
   a primary network control node interface comprising a physical interface to physically couple the primary network control node to the secondary communications network node and a communications interface to communicatively couple the first primary network control node radio with the at least one processor of the secondary communications network node when the primary network control node is physically coupled to the secondary communications network node via the primary network control node interface.

2. The secondary communications network node of claim 1, the secondary communications network node further comprising:
   at least one nontransitory processor-readable storage medium operatively coupled to the at least one processor of the secondary communications network node and storing at least one of data or instructions which, when executed by the at least one processor of the secondary communications network node, cause the at least one processor of the secondary communications network node to cause the secondary communications network radio to: wirelessly send data or instructions to the at least one of the wireless light sources or the wireless luminaires via the secondary communications network.

3. The secondary communications network node of claim 1, the secondary communications network node further comprising:
   at least one nontransitory processor-readable storage medium operatively coupled to the at least one processor of the secondary communications network node and storing at least one of data or instructions which, when executed by the at least one processor of the secondary communications network node, cause the at least one processor of the secondary communications network node to cause the secondary communications network radio to: wirelessly receive data or instructions from the at least one of the wireless light sources or the wireless luminaires.

4. The secondary communications network node of claim 1 wherein in operation the secondary communications network radio enables power switching to, and power measurement of, the at least one of wireless light sources or wireless luminaires by the control node.

5. The secondary communications network node of claim 1 wherein in operation the at least one processor:
   receives, via the primary network control node interface, at least one of instructions or data; and
   causes the secondary communications network radio to wirelessly send the received at least one of instructions or data to the at least one of the wireless light sources or the wireless luminaires, via the secondary communications network, in a format that is readable by the at least one of the wireless light sources or the wireless luminaires.

6. The secondary communications network node of claim 1 wherein in operation the at least one processor:
   receives, via the secondary communications network radio, at least one of instructions or data from the at least one of wireless light sources or wireless luminaires; and
   sends, via the primary network control node interface, the received at least one of instructions or data to the primary network control node.

7. The secondary communications network node of claim 1 wherein in operation the at least one processor:
   addresses communications to specific ones of the at least one of the wireless light sources or the wireless luminaires.

8. The secondary communications network node of claim 1, further comprising:
   at least one of an analog dimming receiver or a digitally addressable lighting interface (DALI) transceiver.

9. The secondary communications network node of claim 1 wherein the primary network control node is separate and distinct from the secondary communications network node, and the primary network control node interface of the secondary communications network node is one of a 5-pin receptacle interface or a 7-pin receptacle interface that mates with a physical node interface of the primary network control node.

10. The secondary communications network node of claim 1 wherein the primary network control node is separate and distinct from the secondary communications network node, and the primary network control node interface of the secondary communications network node is a hardwired interface.

11. The secondary communications network node of claim 1 wherein the primary network control node interface of the secondary communications network node is a standard-based receptacle.

12. The secondary communications network node of claim 1 wherein secondary communications network node that is mountable at least one of: inside a housing of a luminaire fixture, to a top of the housing of the luminaire fixture, or to a pole that supports the luminaire fixture.

13. The secondary communications network node of claim 1, the secondary communications network node further comprising:

at least one nontransitory processor-readable storage medium operatively coupled to the at least one processor of the secondary communications network node and storing an aggregate status for a plurality of wireless light sources or wireless luminaires of the at least one of: a number of wireless light sources or a number of wireless luminaires.

14. The secondary communications network node of claim 13 wherein the at least one processor of the secondary communications network node provides the aggregate status for the plurality of wireless light sources or the wireless luminaires as a single operational status for a group to the first primary network control node radio via the primary network control node interface for wireless transmission to the central management system via the primary communications network, the group consisting of the plurality of wireless light sources or the wireless luminaires.

15. The secondary communications network node of claim 13 wherein the at least one processor of the secondary communications network node provides the aggregate status for the plurality of wireless light sources or the wireless luminaires as a single aggregate power draw for a group to the first primary network control node radio via the primary network control node interface for wireless transmission to the central management system via the primary communications network, the group consisting of the plurality of wireless light sources or the wireless luminaires.

16. The secondary communications network node of claim 1 wherein the a secondary communications network radio provides wireless communications with at least one mobile communications device, and the at least one processor of the secondary communications network node controls the at least one of the number of wireless light sources or the wireless luminaires based at least in part on the wireless communications with the at least one mobile communications device.

17. A method of operating a secondary communications network node for operating luminaires in conjunction with a primary network control node, the primary network control node which includes a first primary network control node radio that provides wireless communications with a remotely located central management system via a primary communications network, the method comprising:
providing a secondary communications network node comprising a housing; a secondary communications network radio housed by the housing, the secondary communications network radio which provides wireless communications with at least one of: a number of wireless light sources or a number of wireless luminaires via a secondary communications network, the secondary communications network distinct from the primary communications network; at least one processor housed by the housing, the at least one processor communicatively coupled to the secondary communications network radio; and a primary network control node interface comprising a physical interface to physically coupled the primary network control node to the secondary communications network node and a communications interface to communicatively couple the first primary network control node radio with the at least one processor of the secondary communications network node when the primary network control node is physically coupled to the secondary communications network node via the primary network control node interface;
receiving by the at least one processor of the secondary communications network node, via the primary network control node interface, at least one of instructions or data; and
causing, by the at least one processor of the secondary communications network node, the secondary communications network radio to wirelessly send data or instructions to the at least one of the wireless light sources or the wireless luminaires via the secondary communications network.

18. The method of claim 17 wherein:
receiving by the at least one processor of the secondary communications network node, via the primary network control node interface, at least one of instructions or data includes receiving at least one of instructions or data provided to the primary network control node by a central via a cellular network; and
causing the secondary communications network radio to wirelessly send data or instructions to the at least one of the wireless light sources or the wireless luminaires via the secondary communications network includes causing the secondary communications network radio to wirelessly send data or instructions via a short range radio.

19. The method of claim 17, further comprising:
receiving, via the secondary communications network radio, at least one of instructions or data from two or more of the at least one of the wireless light sources or the wireless luminaires; and
sending, via the primary network control node interface, the received at least one of instructions or data to the primary network control node.

20. The method of claim 17, further comprising:
receiving, by the at least one processor via the primary network control node interface, at least one of instructions or data; and
causing, by the at least one processor, the secondary communications network radio to wirelessly send the received at least one of instructions or data to two or more of the at least one of the wireless light sources or the wireless luminaires in a format that is readable by the at least one of the wireless light sources or the wireless luminaires.

21. The method of claim 17 wherein the primary network control node interface of the adapter system comprises one of a 5-pin receptacle interface or a 7-pin receptacle interface, and physically and communicatively coupling the primary network control node to the secondary communications network node comprises physically and communicatively coupling a plug of the primary network control node to the one of the 5-pin receptacle interface or the 7-pin receptacle interface.

22. The method of claim 17 wherein communicatively coupling the primary network control node to the secondary communications network node comprises physically and communicatively coupling the primary network control node to the secondary communications network node via a hardwired interface.

23. The method of claim 17 wherein providing a secondary communications network node comprises mounting the secondary communications network node to a non-legacy luminaire fixture, and causing the secondary communications network radio to wirelessly send data or instructions to the at least one of the wireless light sources or the wireless luminaires via the secondary communications network includes causing the secondary communications network radio to wirelessly send data or instructions to respective wireless light source of each of a plurality of legacy luminaire fixtures.

24. The method of claim 17, further comprising:

wirelessly communicating with at least one mobile communications device via the secondary communications network radio; and controlling, via the at least one processor of the secondary communications network node, the at least one of the number of wireless light sources or the wireless luminaires based at least in part on the wireless communications with the at least one mobile communications device.

* * * * *